(12) United States Patent
Yamaguchi et al.

(10) Patent No.: US 8,257,837 B2
(45) Date of Patent: Sep. 4, 2012

(54) ORGANIC LIGHT-EMITTING DEVICE

(75) Inventors: Tetsuhiko Yamaguchi, Chiba (JP); Yoshiaki Takahashi, Chiba (JP)

(73) Assignee: Showa Denko K.K., Tokyo (JP)

( * ) Notice: Subject to any disclaimer, the term of this patent is extended or adjusted under 35 U.S.C. 154(b) by 1039 days.

(21) Appl. No.: 12/158,193

(22) PCT Filed: Dec. 19, 2006

(86) PCT No.: PCT/JP2006/325683
§ 371 (c)(1), (2), (4) Date: Jun. 19, 2008

(87) PCT Pub. No.: WO2007/072962
PCT Pub. Date: Jun. 28, 2007

(65) Prior Publication Data
US 2009/0091249 A1 Apr. 9, 2009

Related U.S. Application Data

(60) Provisional application No. 60/754,660, filed on Dec. 30, 2005.

(30) Foreign Application Priority Data

Dec. 22, 2005 (JP) ................................. 2005-369455

(51) Int. Cl.
*H01L 51/54* (2006.01)
*C09K 11/00* (2006.01)
(52) U.S. Cl. ........ 428/690; 428/917; 313/504; 313/506; 252/301.16; 257/40; 257/E51.028; 257/E51.044; 257/E51.051; 548/440
(58) Field of Classification Search ............ 257/E51.051
See application file for complete search history.

(56) References Cited

U.S. PATENT DOCUMENTS 7,872,411 B2 * 1/2011 Yamaguchi et al. .......... 313/504
2002/0193532 A1 * 12/2002 Ikehira et al. ................ 525/333.3
2004/0109955 A1 * 6/2004 Kitano et al. ................. 428/1.1

FOREIGN PATENT DOCUMENTS

| EP | 1 229 063 A2 | 8/2002 |
| EP | 1 394 188 A1 | 3/2004 |
| JP | 2003-206320 A | 7/2003 |
| JP | 2003-308978 A | 10/2003 |
| JP | 2005-097589 A | 4/2005 |
| WO | 2004/106409 A1 | 12/2004 |
| WO | WO 2007/020881 A1 * | 2/2007 |

OTHER PUBLICATIONS

Li J.C. et al, "Patterned Redox Arrays of Polyarylamines III. Effect of Molecular Structure and Oxidation Potential on Film Morphology and Hole-Injection in Single-Layer Organic Diodes" Chem. Mater., 2004, pp. 4711-4714, vol. 16.

* cited by examiner

*Primary Examiner* — Jennifer Chriss
*Assistant Examiner* — Michael H Wilson
(74) *Attorney, Agent, or Firm* — Sughrue Mion, PLLC

(57) ABSTRACT

An organic light-emitting device in which at least one organic layer including a light-emitting layer is sandwiched between an anode and a cathode and a phosphorescent compound in the light-emitting layer emits light. The light-emitting layer contains a polymer compound including a structural unit derived from a polymerizable compound (A) represented by the following general formula (1) where $R^1$-$R^{24}$ are as defined herein:

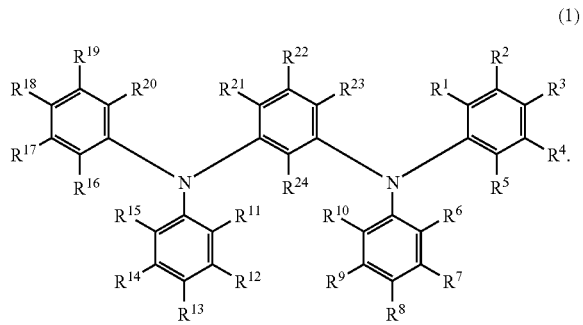

(1)

11 Claims, 1 Drawing Sheet

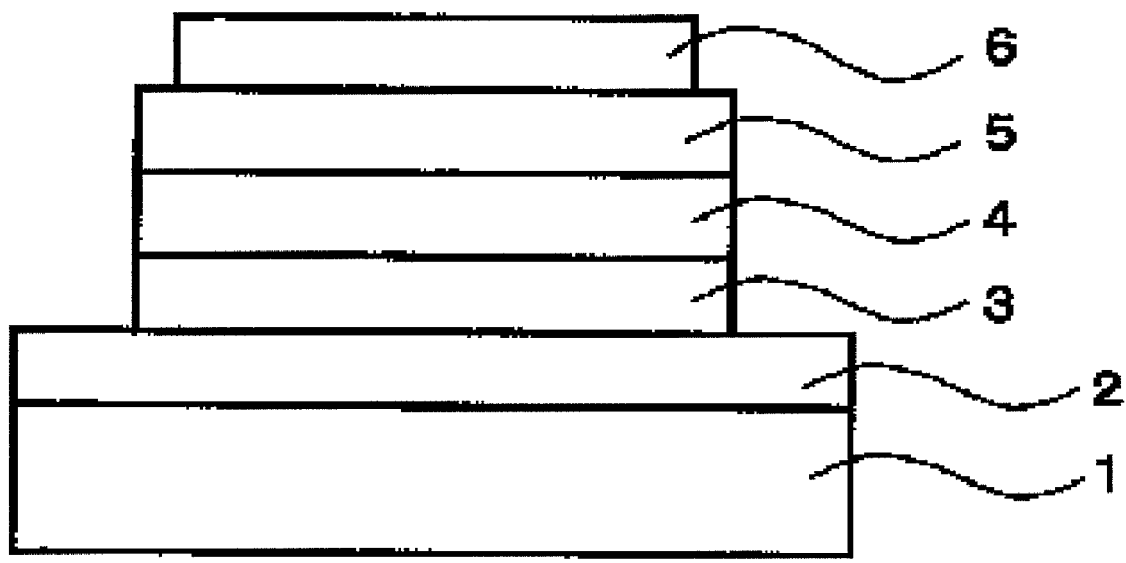

ORGANIC LIGHT-EMITTING DEVICE

CROSS-REFERENCE TO RELATED APPLICATIONS

This application claims the benefit under 35 U.S.C. sctn. 119(e) of U.S. Provisional Application No. 60/754,660 filed on Dec. 30, 2005.

TECHNICAL FIELD

The present invention relates to an organic light-emitting device. More particularly, the present invention relates to an organic light-emitting device capable of attaining high brightness and long life together with high luminous efficiency by using a polymer containing a structural unit derived from a specific polymerizable compound having hole transport property.

BACKGROUND ART

As an organic light-emitting device, there is known a device having a multilayer structure in which a light-emitting layer comprising a phosphorescent low molecular weight compound is provided between a hole transport layer and an electron transport layer. A low molecular weight compound such as a triphenylamine derivative is used in the hole transport layer (see Patent Document 1).

When each of such layers as mentioned above is formed by using a low molecular weight compound, however, vacuum deposition method is generally employed, and there have been problems that vacuum equipment is required, that the film thickness of the layer is likely to be uneven, and that devices with large areas are difficult to produce. In addition, there has been a problem that an organic light-emitting device comprising a light-emitting layer obtained from a phosphorescent low molecular weight compound is inferior in the durability.

Meanwhile, development has also progressed for a phosphorescent polymer which is obtained by copolymerizing a phosphorescent polymerizable compound and an charge transport polymerizable compound. Such a phosphorescent polymer compound has the advantage that the light-emitting layer can be formed by a coating method such as spin coating. For example, Patent Document 2 discloses a copolymer of a triphenylamine derivative and an iridium complex.

[Patent Document 1] JP-A-2003-308978
[Patent Document 2] JP-A-2005-97589

DISCLOSURE OF THE INVENTION

With the above-described polymer, however, there was room for improvement with respect to the maximum attainable brightness and the durability although high luminous efficiency was attained.

It is an object of the present invention to provide an organic light-emitting device having high brightness and long life together with high luminous efficiency.

As a result of earnest studies to solve the aforementioned problems, the present inventors have found that an organic light-emitting device having high brightness and long life together with high luminous efficiency can be obtained using a polymer compound comprising a structural unit derived from a specific polymerizable compound having a hole transport property, and have completed the present invention.

Namely, the present invention is summarized as follows:

[1] An organic light-emitting device in which at least one organic layer comprising a light-emitting layer is sandwiched between an anode and a cathode and a phosphorescent compound in the light-emitting layer emits light, wherein the light-emitting layer comprises a polymer compound comprising a structural unit derived from a polymerizable compound (A) represented by the following general formula (1):

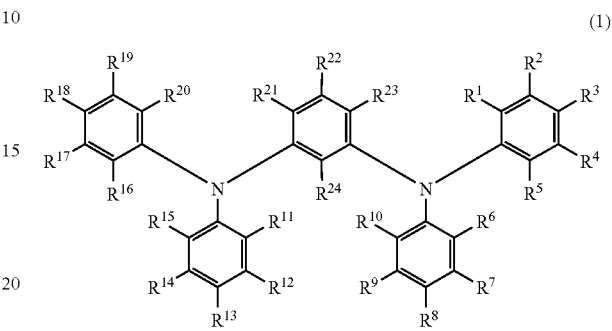

(1)

(In formula (1), at least one of $R^1$-$R^{24}$ represents a substituent having a polymerizable functional group; $R^1$-$R^{24}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms, a carbazolyl group and a silyl group; and in each of $R^1$-$R^5$, $R^6$-$R^{10}$, $R^{11}$-$R^{15}$, $R^{16}$-$R^{20}$ and $R^{21}$-$R^{23}$, two groups bonding to adjacent carbon atoms in the benzene ring may bond to each other to form a fused ring);

[2] An organic light-emitting device according to [1], wherein said polymer compound further comprises a structural unit derived from a phosphorescent polymerizable compound (B);

[3] An organic light-emitting device according to [1], wherein said polymer compound further comprises a structural unit derived from a phosphorescent polymerizable compound (B) and a structural unit derived from an electron transport polymerizable compound (C);

[4] An organic light-emitting device according to [2] or [3], wherein said phosphorescent polymerizable compound (B) is a complex represented by the following general formula (2-1):

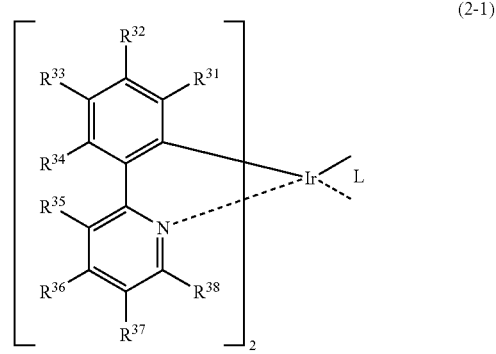

(2-1)

(In formula (2-1), $R^{31}$-$R^{38}$ each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; each two groups of $R^{31}$ and $R^{32}$, $R^{32}$ and $R^{33}$, $R^{33}$ and $R^{34}$, $R^{34}$ and $R^{35}$, $R^{35}$ and $R^{36}$, 36 and $R^{37}$, and $R^{37}$ and $R^{38}$ may bond to each other to form a fused ring; and L represents a bidentate ligand selected from the group consisting of the following general formulae (2-2) to (2-4).)

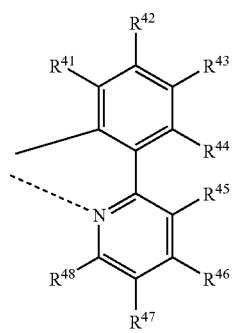

(2-2)

(In formula (2-2), at least one of $R^{41}$-$R^{48}$ represents a substituent having a polymerizable functional group; $R^1$-$R^{24}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{41}$ and $R^{42}$, $R^{42}$ and $R^{43}$, $R^{43}$ and $R^{44}$, $R^{44}$ and $R^{45}$, $R^{45}$ and $R^{46}$, $R^{46}$ and $R^{47}$, and $R^{47}$ and $R^{48}$ may bond to each other to form a fused ring.)

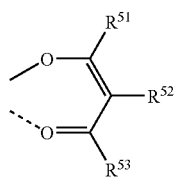

(2-3)

(In formula (2-3), at least one of $R^{51}$-$R^{53}$ represents a substituent having a polymerizable functional group; $R^{51}$-$R^{53}$ except for the at least one substituent having a polymerizable functional group each represent independently an atom or a substituent selected from the group consisting of a hydrogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a Silyl group; and each two groups of $R^{51}$ and $R^{52}$ and $R^{52}$ and $R^{53}$ may bond to each other to form a fused ring.)

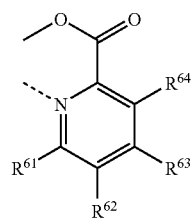

(2-4)

(In formula (2-4), at least one of $R^{61}$-$R^{64}$ represents a substituent having a polymerizable functional group; $R^{61}$-$R^{64}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{61}$ and $R^{62}$, $R^{62}$ and $R^{63}$, and $R^{63}$ and $R^{64}$ may bond to each other to form a fused ring);

[5] An organic light-emitting device according to [1], wherein said light-emitting layer further comprises a phosphorescent compound (E);

[6] An organic light-emitting device according to [1], wherein said light-emitting layer further comprises a phosphorescent compound (E) and said polymer compound further comprises a structural unit derived from an electron transport polymerizable compound (C);

[7] An organic light-emitting device according to [3] or [6], wherein said electron transport polymerizable compound (C) is an oxadiazole derivative, a triazole derivative or a triarylborane derivative;

[8] An area light source, wherein the organic light-emitting device according to any one of [1] to [7] is used;

[9] An image display device, wherein the organic light-emitting device according to any one of [1] to [7] is used;

[10] A polymer compound comprising a structural unit derived from a polymerizable compound (A) represented by the following general formula (1):

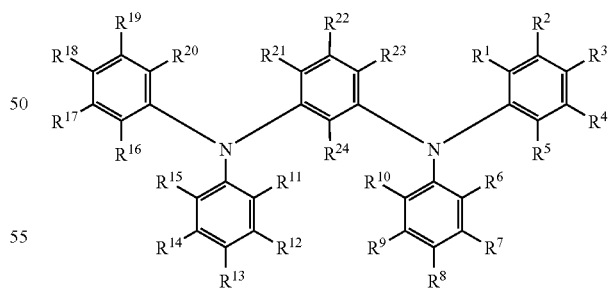

(1)

(In formula (1), at least one of $R^1$-$R^{24}$ represents a substituent having a polymerizable functional group; $R^1$-$R^{24}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms, a carbazolyl group and a silyl group; and in each of $R^1$-$R^5$, $R^6$-$R^{10}$, $R^{11}$-$R^{15}$, $R^{16}$-$R^{20}$ and $R^{21}$-$R^{23}$, two groups bonding to adjacent carbon atoms in the benzene ring may bond to each other to form a fused ring); and

[11] A polymer compound according to [9] comprising a structural unit derived from a phosphorescent polymerizable compound (B) represented by the following general formula (2-1):

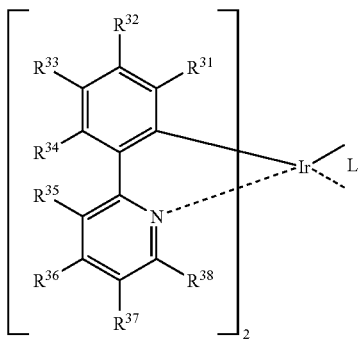

(2-1)

(In formula (2-1), $R^{31}$-$R^{38}$ each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; each two groups of $R^{31}$ and $R^{32}$, $R^{32}$ and $R^{33}$, $R^{33}$ and $R^{34}$, $R^{34}$ and $R^{35}$, $R^{35}$ and $R^{36}$ $R^{36}$ and $R^{37}$, and $R^{37}$ and $R^{38}$ may bond to each other to form a fused ring; and L represents a bidentate ligand selected from the group consisting of the following general formulae (2-2) to (2-4).)

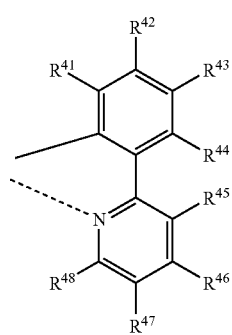

(2-2)

(In formula (2-2), at least one of $R^{41}$-$R^{48}$ represents a substituent having a polymerizable functional group; $R^{41}$-$R^{48}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{41}$ and $R^{42}$, $R^{42}$ and $R^{43}$, $R^{43}$ and $R^{44}$, $R^{44}$ and $R^{45}$, $R^{45}$ and $R^{46}$, $R^{46}$ and $R^{47}$, and $R^{47}$ and $R^{48}$ may bond to each other to form a fused ring.)

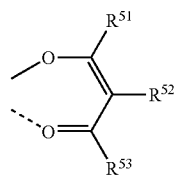

(2-3)

(In formula (2-3), at least one of $R^{51}$-$R^{53}$ represents a substituent having a polymerizable functional group; $R^{51}$-$R^{53}$ except for the at least one substituent having a polymerizable functional group each represent independently an atom or a substituent selected from the group consisting of a hydrogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{51}$ and $R^{52}$ and $R^{52}$ and $R^{53}$ may bond to each other to form a fused ring.)

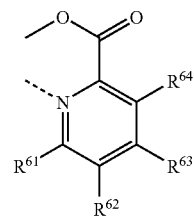

(2-4)

(In formula (2-4), at least one of $R^{61}$-$R^{64}$ represents a substituent having a polymerizable functional group; $R^{61}$-$R^{64}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a Silyl group; and each two groups of $R^{61}$ and $R^{62}$, $R^{62}$ and $R^{63}$, and $R^{63}$ and $R^{64}$ may bond to each other to form a fused ring).

EFFECT OF THE INVENTION

The organic light-emitting device of the present invention has high brightness and long life together with high luminous efficiency.

BRIEF DESCRIPTION OF THE DRAWING

FIG. 1 shows a cross-sectional view of an example of the organic light-emitting device relating to the present invention.
  1: Glass substrate
  2: Anode
  3: Hole transport layer
  4: Light-emitting layer
  5: Electron transport layer
  6: Cathode

BEST MODES FOR CARRYING OUT THE INVENTION

Hereinafter, the present invention will be specifically explained.

1. Light-Emitting Layer

In the organic light-emitting device of the present invention, at least one organic layer comprising a light-emitting layer is sandwiched between an anode and a cathode and a phosphorescent compound in the light-emitting layer emits light. The light-emitting layer comprises a specific polymer compound. The polymer compound is a novel polymer compound comprising a structural unit derived from a hole transport polymerizable compound (A) represented by formula (1). The polymer compound may further have a structural unit derived from a phosphorescent polymerizable compound (B) and/or a structural unit derived from an electron transport polymerizable compound (C). The polymer compound can be obtained by polymerizing the hole transport polymerizable compound (A) and, if necessary, the phosphorescent polymerizable compound (B) and/or the electron transport polymerizable compound (C).

Specifically, the polymer compound may be any of a polymer compound (I) which is obtained by polymerizing the polymerizable compound (A) represented by formula (1) and the phosphorescent polymerizable compound (B), a polymer compound (II) which is obtained by polymerizing the polymerizable compound (A) represented by formula (1), the phosphorescent polymerizable compound (B) and the electron transport polymerizable compound (C), a polymer compound (III) which is obtained by polymerizing the polymerizable compound (A) represented by formula (1), and a polymer compound (IV) which is obtained by polymerizing the polymerizable compound (A) represented by formula (1) and the electron transport polymerizable compound (C).

In the case where the polymer compound comprising a structural unit derived from the compound (A) also contains a structural unit derived from a phosphorescent polymerizable compound (B) (for example, in the case of polymer compound (I) and polymer compound (II)), the polymer compound alone can form the light-emitting layer. On the other hand, in the case where the polymer compound comprising a structural unit derived from compound (A) contains no structural unit derived from a phosphorescent polymerizable compound (B) (for example, in the case of polymer compound (III) and polymer compound (IV)), the light-emitting layer is formed by using a phosphorescent low molecular weight compound (E) together with the polymer compound.

The novel polymer compound comprising a structural unit derived from the compound (A) is excellent in hole transport property, and therefore an organic light-emitting device having high brightness and long life together with high luminous efficiency can be obtained in any of the above cases owing to use of said polymer compound.

In the present specification, a hole transport polymerizable compound and an electron transport polymerizable compound may be collectively referred to as "a carrier transport polymerizable compound".

In the compound (A) used in the present invention, at least one of $R^1$-$R^2$ represents a substituent having a polymerizable functional group, and $R^1$-$R^{24}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms, a carbazolyl group and a silyl group. The compound (A) may be used alone or as a combination of two or more kinds thereof.

Said halogen atom includes a fluorine atom, a chlorine atom, a bromine atom and an iodine atom.

As said alkyl group having 1 to 10 carbon atoms, there may be mentioned, for example, a methyl group, an ethyl group, a propyl group, an isopropyl group, a butyl group, an isobutyl group, a t-butyl group, an amyl group, a hexyl group, an octyl group, a decyl group and the like.

As said aryl group having 6 to 10 carbon atoms, there may be mentioned, for example, a phenyl group, a tolyl group, a xylyl group, a mesityl group, a naphthyl group and the like.

As said amino group optionally substituted by alkyl group(s) having 1 to 10 carbon atoms, there may be mentioned, for example, an amino group, a dimethylamino group, a diethylamino group, a dibutylamino group and the like.

As said alkoxy group having 1 to 10 carbon atoms, there may be mentioned, for example, a methoxy group, an ethoxy group, a propoxy group, an isopropoxy group, a butoxy group, an isobutoxy group, a t-butoxy group, a hexyloxy group, a 2-ethylhexyloxy group, a decyloxy group and the like.

Said carbazolyl group may have a substituent such as a methyl group, an ethyl group, a t-butyl group and a methoxy group.

As said silyl group, there may be mentioned, for example, a trimethylsilyl group, triethylsilyl group, a t-butyldimethylsilyl group, a trimethoxysilyl group and the like.

Among these, preferable atoms or substituents are a hydrogen atom, a fluorine atom, a cyano group, a methyl group, a t-butyl group, a dimethylamino group, a methoxy group and a carbazolyl group. Specifically, from the viewpoint of life duration and efficiency of the organic light-emitting device, it is preferable that at least one of $R^2$, $R^7$, $R^{12}$ and $R^{17}$ is each independently a methyl group, a dimethylamino group, a methoxy group or a carbazolyl group and $R^1$-$R^{24}$ except for these groups and a substituent having a polymerizable functional group are hydrogen atoms. It is more preferred that each of $R^2$, $R^7$, $R^{12}$ and $R^{17}$ is independently a methyl group, a dimethylamino group, a methoxy group or a carbazolyl group and $R^1$-$R^{24}$ except for these groups and a substituent having a polymerizable functional group are hydrogen atoms. In addition, from the viewpoint of life duration and efficiency of the organic light-emitting device, it is preferable that at least one of $R^3$, $R^8$, $R^{13}$ and $R^{18}$ is each independently a methyl group, a dimethylamino group, a methoxy group or a carbazolyl group and $R^1$-$R^{24}$ except for these groups and a substituent having a polymerizable functional group are hydrogen atoms. It is more preferred that each of $R^3$, $R^8$, $R^{13}$ and $R^{18}$ is independently a methyl group, a dimethylamino group, a methoxy group or a carbazolyl group and $R^1$-$R^{24}$ except for these groups and a substituent having a polymerizable functional group are hydrogen atoms.

In each of $R^1$-$R^5$, $R^6$-$R^{10}$, $R^{11}$-$R^{15}$, $R^{16}$-$R^{20}$ and $R^{21}$-$R^{23}$, two groups bonding to adjacent carbon atoms in the benzene ring may bond to each other to form a fused ring.

At least one of $R^1$-$R^{24}$ represents a substituent having a polymerizable functional group.

Said substituent is not particularly limited as long as it has a polymerizable functional group, and it includes the above-described substituents and the like.

Said polymerizable functional group may be capable of any of radical polymerization, cationic polymerization, anionic polymerization, addition polymerization and condensation polymerization. Among these a radical polymerizable functional group is preferable because the polymer compound is easily produced.

As said polymerizable functional group, there may be mentioned, for example, an allyl group, an alkenyl group, an acrylate group, a methacrylate group, an urethane (meth) acrylate group such as a methacryloyloxyethylcarbamate group, a vinylamide group and a derivative thereof, and the like, among which an alkenyl group is preferable.

Taking the case where said polymerizable functional group is an alkenyl group as an example, specifically, it is more preferable that the compound (A) has an alkenyl group as a substituent represented by the following formulae (a1) to (a13). Among these, substituents represented by the following formulae (a1), (a5), (a8), (a12) and (a13) are further preferable because the functional group can be easily introduced into the compound.

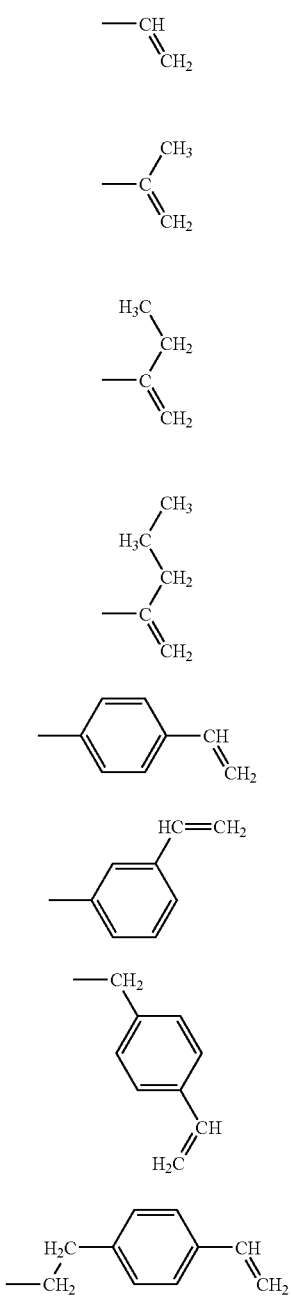

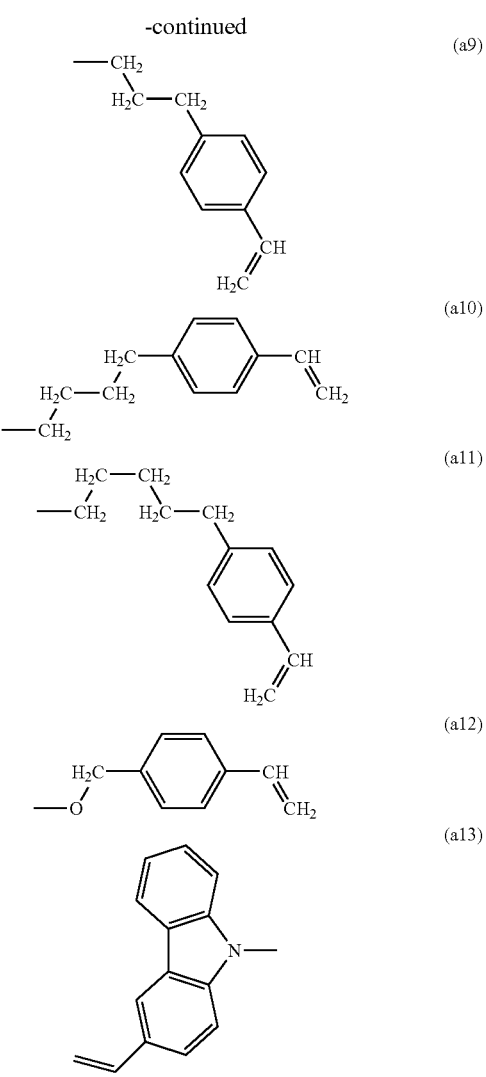

In the case where said polymerizable functional group is a functional group other than an alkenyl group, preferred substituents have structure in which the alkenyl group in formulae (a1) to (a13) is replaced by the functional group.

In the compound (A), $R^{22}$ is preferably a substituent having a polymerizable functional group.

Such a compound (A) can be produced, for example, by palladium-catalyzed substitution reaction of a m-phenylenediamine derivative with an aryl halide or a diarylamine with a m-dibromobenzene derivative. A specific method of the substitution reaction is described, for example, in Tetrahedron Letters, 1998, Vol. 39, p. 2367.

The compound (B) used in the present invention is not particularly limited as long as it is a low molecular weight compound that has a substituent having a polymerizable functional group and brings about luminescence from the triplet excited state at room temperature. The compound (B) is preferably a palladium complex, an osmium complex, an iridium complex, a platinum complex or a gold complex, more preferably an iridium complex or a platinum complex, most preferably an iridium complex, which comprises a substituent having a polymerizable functional group. The substituent having a polymerizable functional group has the same meaning as the substituent having a polymerizable functional group in the compound (A). The compound (B) may be used alone or as a combination of two or more kinds thereof.

As said iridium complex, the complex represented by formula (2-1) is suitably used.

In formula (2-1), $R^{31}$-$R^{38}$ each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group. Specifically, as these atoms and substituents, there may be mentioned the atoms and the substituents as described above.

Preferably each of $R^{31}$-$R^{38}$ is a hydrogen atom, a fluorine atom, cyano group, a methyl group, a t-butyl group, a dimethylamino group, a butoxy group or a 2-ethylhexyloxy group. Specifically, it is preferable that $R^{32}$ is a t-butyl group and $R^{31}$-$R^{38}$ except for $R^{32}$ are hydrogen atoms.

Each two groups of $R^{31}$ and $R^{32}$, $R^{32}$ and $R^{33}$, $R^{33}$ and $R^{34}$, $R^{34}$ and $R^{35}$, $R^{35}$ and $R^{36}$, $R^{36}$ and $R^{37}$, and $R^{37}$ and $R^{38}$ may bond to each other to form a fused ring. As said fused ring, there may be mentioned, for example, a naphthalene ring, an anthracene ring, a phenanthrene ring, a pyrene ring, a perylene ring, a quinoline ring, a isoquinoline ring, a naphthyridine ring and the like.

L represents a bidentate ligand selected from the group consisting of formulae (2-2) to (2-4).

In formula (2-2), at least one of $R^{41}$-$R^{48}$ represents a substituent having a polymerizable functional group; and each of $R^{41}$-$R^{48}$ except for the at least one substituent having a polymerizable functional group is independently an atom or a substituent which has the same meaning as that of $R^{31}$.

Each of $R^{41}$-$R^{48}$ is preferably a hydrogen atom, a fluorine atom, a cyano group, a methyl group, a t-butyl group, a dimethylamino group, a butoxy group or a 2-ethylhexyloxy group.

Each two groups of $R^{41}$ and $R^{42}$, $R^{42}$ and $R^{43}$, $R^{43}$ and $R^{44}$, $R^{44}$ and $R^{45}$, $R^{45}$ and $R^{46}$, $R^{46}$ and $R^{47}$, and $R^{47}$ and $R^{48}$ may bond to each other to form a fused ring.

At least one of $R^{41}$-$R^{48}$ represents a substituent having a polymerizable functional group, which has the same meaning as the substituent having a polymerizable functional group in the compound (A). Preferred substituents are also the same as those for the compound (A).

In formula (2-3), at least one of $R^{51}$-$R^{53}$ represents a substituent having a polymerizable functional group; and each of $R^{51}$-$R^{53}$ except for the at least one substituent having a polymerizable functional group is independently an atom or a substituent similar to that described for $R^{31}$ (provided that a halogen atom is excluded).

Each of $R^{51}$-$R^{53}$ is preferably a methyl group, a t-butyl group, a dimethylamino group or a methoxy group.

$R^{51}$ and $R^{52}$ and/or $R^{52}$ and $R^{53}$ may bond to each other to form a fused ring.

At least one of $R^{51}$-$R^{53}$ represents a substituent having a polymerizable functional group, which has the same meaning as the substituent having a polymerizable functional group in the compound (A). Preferred substituents are also the same as those for compound (A).

In formula (2-4), at least one of $R^{61}$-$R^{64}$ represents a substituent having a polymerizable functional group; and each of $R^{61}$-$R^{64}$ except for the at least one substituent having a polymerizable functional group is independently an atom or a substituent similar to those described for $R^{31}$.

Each of $R^{61}$-$R^{64}$ is preferably a hydrogen atom, a fluorine atom, a cyano group, a methyl group, a t-butyl group, a dimethylamino group, a butoxy group or a 2-ethylhexyloxy group.

Each two groups of $R^{61}$ and $R^{62}$, $R^{62}$ and $R^{63}$, and $R^{63}$ and $R^{64}$ may bond to each other to form a fused ring.

At least one of $R^{61}$-$R^{64}$ represents a substituent having a polymerizable functional group, which has the same meaning as the substituent having a polymerizable functional group in the compound (A). Preferred substituents are also the same as those for the compound (A).

The iridium complex represented by formula (2-1) is produced, for example, as follows. First, a specific bidentate ligand is reacted with an iridium compound (0.5 equivalent) such as iridium chloride in a solvent such as 2-ethoxyethanol. Next, the resultant metal complex and a bidentate ligand having a polymerizable functional group are heated together with sodium carbonate in a solvent such as 2-ethoxyethanol, and the product is purified to obtain the iridium complex represented by formula (2-1). The bidentate ligand having a polymerizable functional group can be obtained by a publicly known method.

As the compound (C) used in the present invention, there are no particular limitations as long as it comprises a substituent having a polymerizable functional group, and publicly known electron transport compounds may be used. Among such compounds, an oxadiazole derivative, a triazole derivative and a triarylborane derivative are suitably used. The compound (C) may be used alone or as a combination of two or more kinds thereof.

Specifically, as the compound (C), there may be mentioned the following compounds (C1) to (C9).

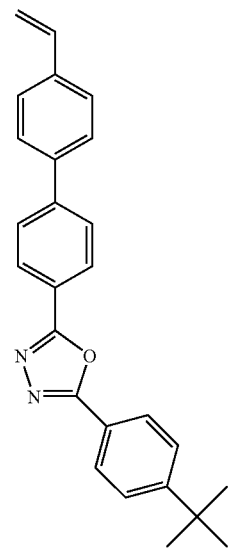

(C1)

(C2)
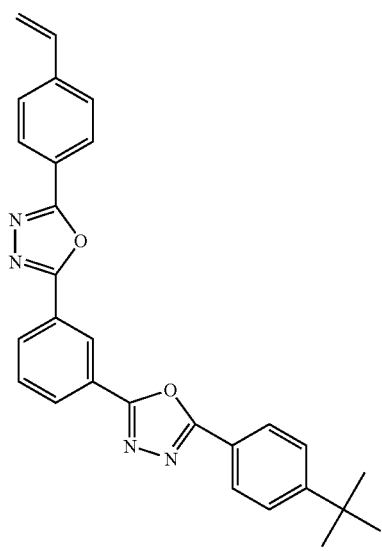
(C3)
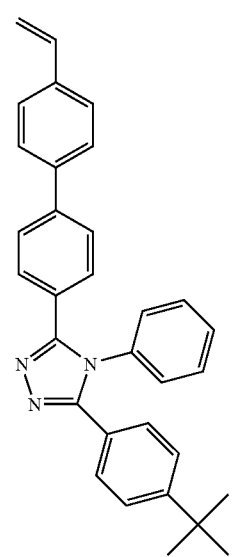
(C4)
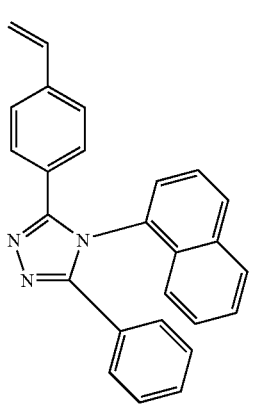
(C5)
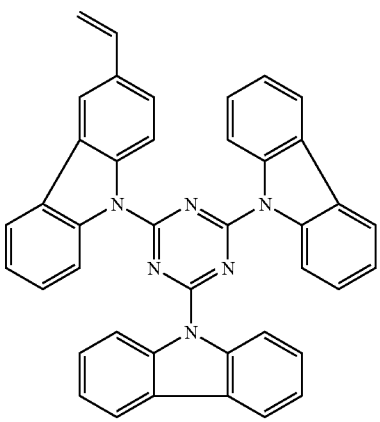
(C6)
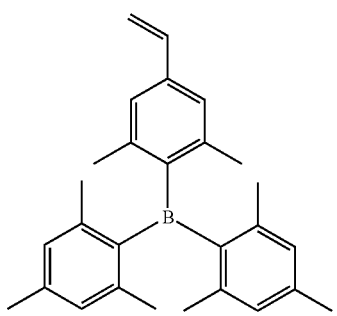
(C7)
(C8)
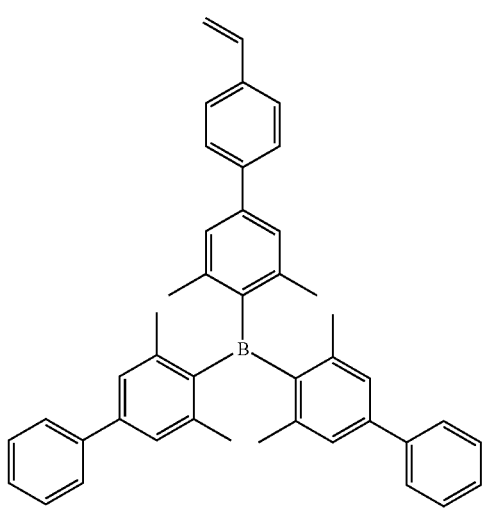

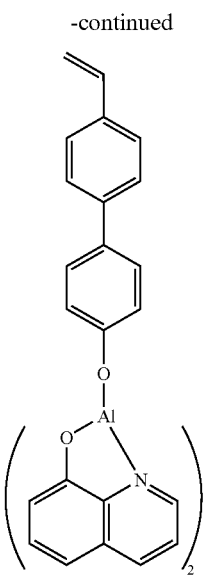

(C9)

The above-described substituent having a polymerizable functional group has the same meaning as the substituent having a polymerizable functional group in the compound (A) and preferred cases thereof are also the same.

Such a compound (C) can be produced by a publicly known method.

In producing said polymer compound, another polymerizable compound may be further used. As such another polymerizable compound, there may be mentioned, for example, compounds having no carrier transport property including an alkyl(meth)acrylate ester such as methyl acrylate and methyl methacrylate, styrene and a derivative thereof, and the like, although not limited thereto.

A method for producing said polymer compound may be any of radical polymerization, cation polymerization, anion polymerization and addition polymerization, among which radical polymerization is preferable.

The weight average molecular weight of said polymer compound is typically 1,000 to 2,000,000, preferably 5,000 to 1,000,000. It is preferable that the weight average molecular weight falls within this range because said polymer compound is soluble in organic solvents and a uniform thin film can be obtained. Here, the weight average molecular weight refers to a value measured by gel permeation chromatography (GPC) using tetrahydrofuran as a solvent at 40° C.

In said polymer compounds (1) and (II), when the number of the structural units derived from the compound (B) is represented by m, and the number of the structural units derived from the carrier transport polymerizable compound(s) (which is the total number of the structural units derived from the compound (A) in polymer compound (I) or the total number of the structural units derived from the compound (A) and the compound (C) in polymer compound (II)) is represented by n (m and n each represent an integer of 1 or more), the ratio of the structural units derived from the compound (B) to the total number of the structural units, that is, the value of $m/(m+n)$, is preferably in the range of 0.001 to 0.5, more preferably in the range of 0.001 to 0.2. If the value of $m/(m+n)$ is within this range, there can be obtained an organic light-emitting device having high carrier mobility, less effect of concentration quenching, and hence a high luminous efficiency.

In polymer compounds (II) and (IV), when the number of the structural units derived from the compound (A) is represented by x and the number of the structural units derived from the compound (C) is represented by y (x and y each represent an integer of 1 or more), the relationship with n mentioned above, $n=x+y$, holds true. The optimal values for the ratio of the number of the structural units derived from the compound (A) to the number of the structural units derived from the carrier transport compounds, $x/n$, and the corresponding ratio of the number of the structural units derived from the compound (C), $y/n$, depend on the charge transporting ability of each structural unit, the concentration and the like. When the light-emitting layer in the organic light-emitting device is formed using only polymer compound (II), the values of $x/n$ and $y/n$ are preferably in the range of 0.05 to 0.95, respectively, more preferably in the range of 0.20 to 0.80. When the light-emitting layer in the organic light-emitting device is formed using polymer compound (IV) and the phosphorescent low molecular weight compound (E), the values of $x/n$ and $y/n$ are preferably in the range of 0.05 to 0.95, respectively, more preferably in the range of 0.20 to 0.80. Here, the equation, $x/n+y/n=1$, holds true. The ratio of each structural unit in polymer compounds as described above can be determined from ICP elemental analysis and $^{13}$C-NMR measurement.

When the ratios of the compound (A), the compound (B) used where necessary, and the compound (C) used where necessary are set as appropriate, said polymer compound with desired properties can be obtained. Here, the polymer compound may be any of a random copolymer, a block copolymer and an alternate copolymer.

In the case where the light-emitting layer is formed by using polymer compound (I) obtained by polymerizing the compound (A) and the compound (B), an electron transport layer may be provided separately. However, the light-emitting layer is preferably formed by using an electron transport compound together with polymer compound (I). A single electron transport compound or a mixture of two or more kinds of such compounds may be used. As the electron transport compound, publicly known compounds as described later may be used, and an oxadiazole derivative and a triarylborane derivative are suitably used. In this case, the light-emitting layer desirably comprises the electron transport compound in an amount of preferably 5 to 95 parts by weight, more preferably 20 to 80 parts by weight, relative to 100 parts by weight of the polymer compound (I).

When the light-emitting layer is formed by using polymer compound (II) obtained by polymerizing the compound (A), the compound (B), and the compound (C), the polymer compound alone can form the light-emitting layer.

On the other hand, when the light-emitting layer is formed by using polymer compound (III), the light-emitting layer is preferably formed by using a phosphorescent compound (E) together with polymer compound (III). A single phosphorescent compound (E) or a combination of two or more kinds of such compounds may be used. Moreover, an electron transport layer may be separately provided or the light-emitting layer may be formed by using said electron transport compound together with polymer compound (III) and said phosphorescent compound (E) As the phosphorescent compound (E), publicly known compounds may be used, and iridium complexes are suitably used. Specifically, there may be mentioned the following complexes (E-1) to (E-39).

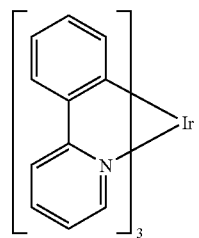
E-1
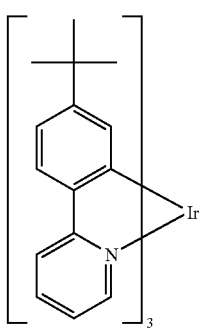
E-2
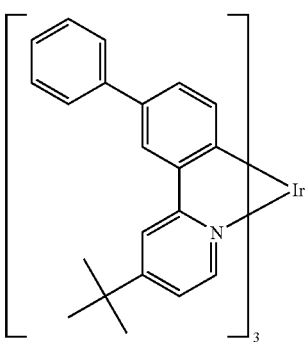
E-3
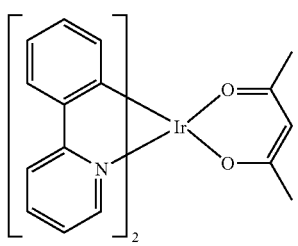
E-4
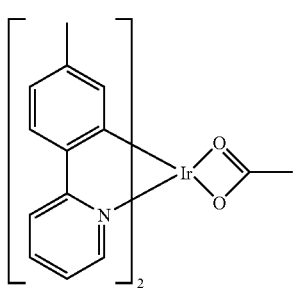
E-5
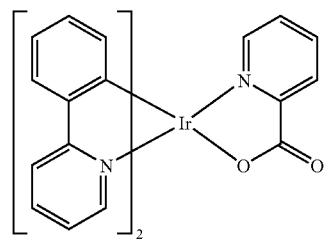
E-6
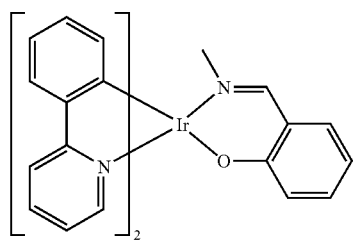
E-7
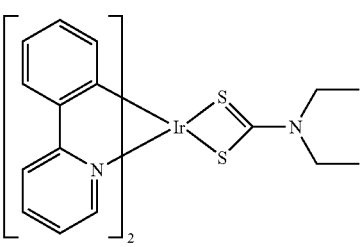
E-8
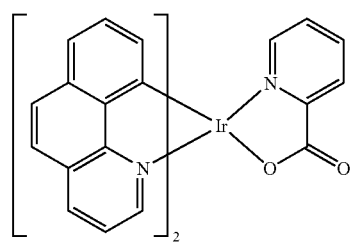
E-9
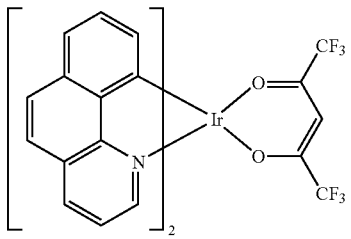
E-10
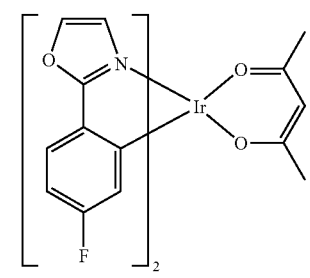
E-11

-continued
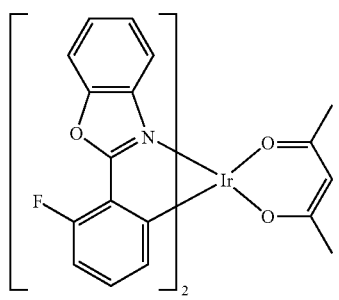
E-12
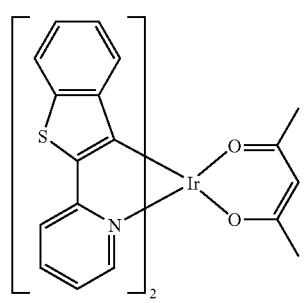
E-13
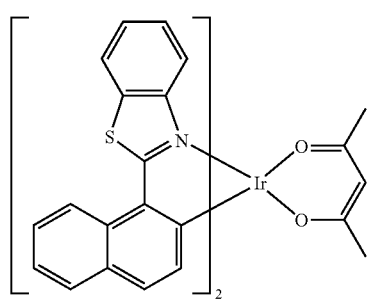
E-14
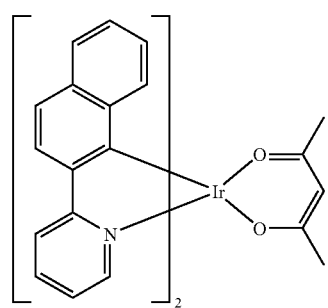
E-15
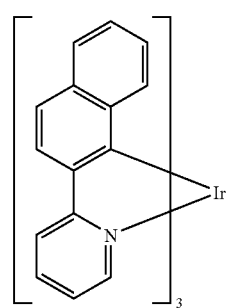
E-16
-continued
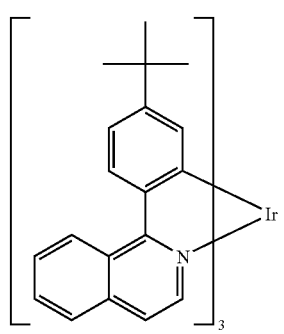
E-17
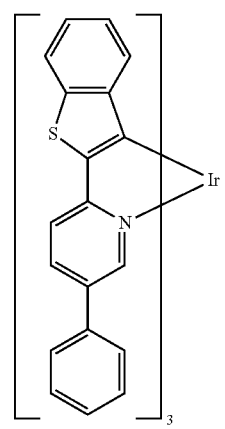
E-18
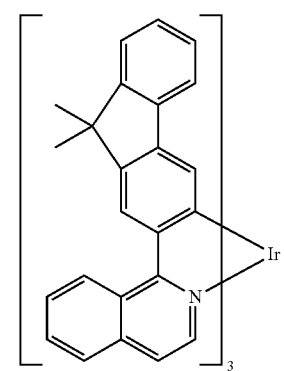
E-19
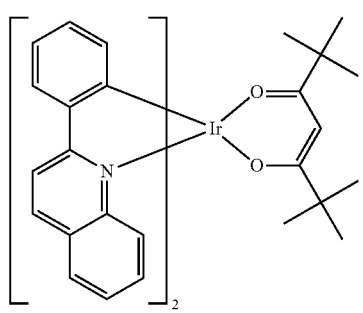
E-20

E-21 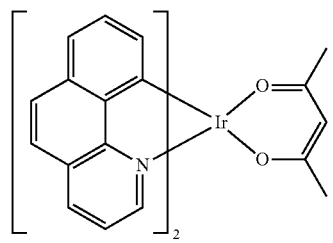
E-22 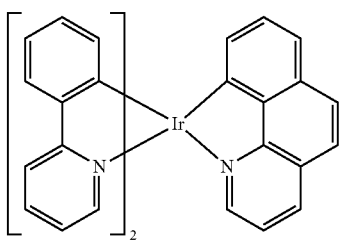
E-23 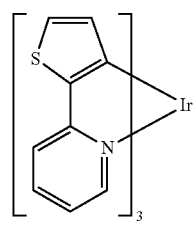
E-24 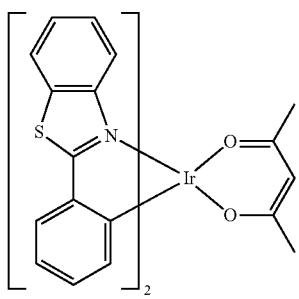
E-25 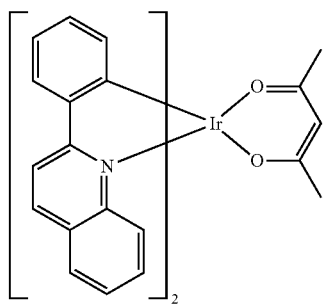
E-26 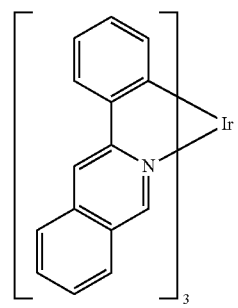
E-27 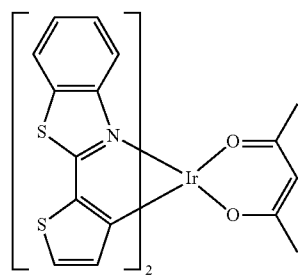
E-28 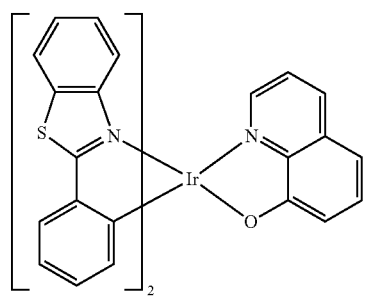
E-29 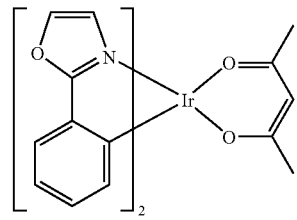
E-30 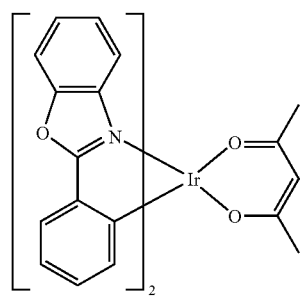
E-31 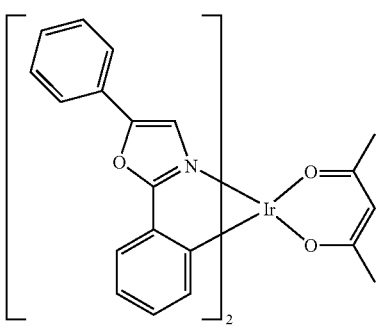

E-32 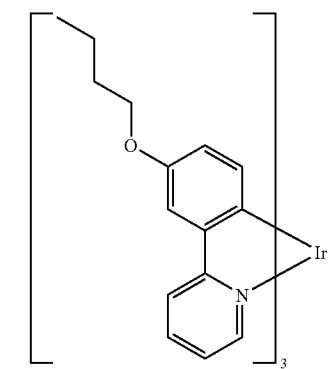

E-33 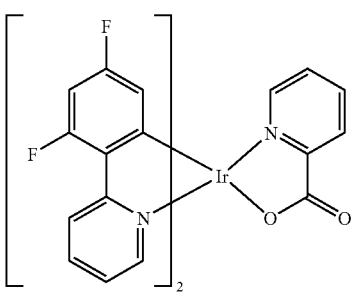

E-34 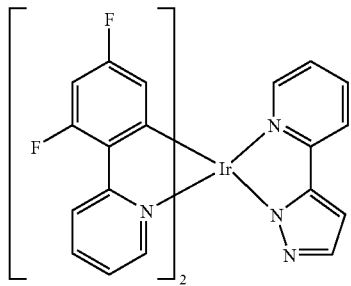

E-35 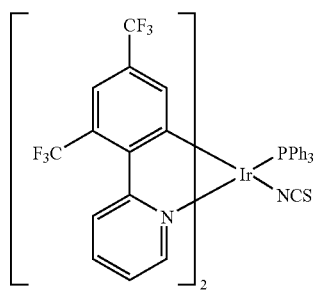

E-36 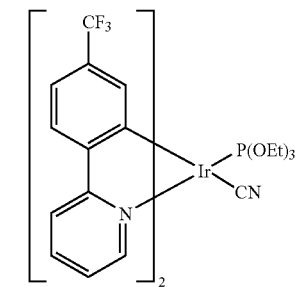

E-37 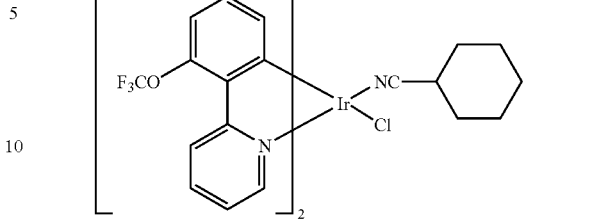

E-38 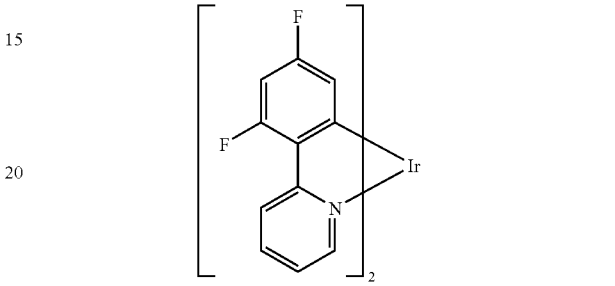

E-39 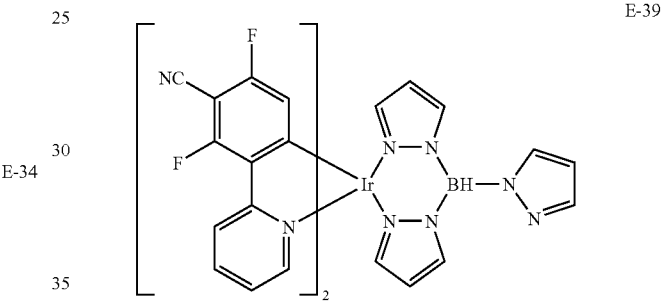

In this case, the light-emitting layer desirably comprises the phosphorescent low molecular weight compound (E) in an amount of preferably 1 to 50 parts by weight, more preferably 5 to 20 parts by weight, relative to 100 parts by weight of the polymer compound (III). In addition, when the light-emitting layer further comprises the electron transport compound, the light-emitting layer desirably comprises the electron transport compound in an amount of preferably 5 to 95 parts by weight, more preferably 20 to 80 parts by weight, relative to 100 parts by weight of the polymer compound (III).

In the case where the light-emitting layer is formed by using polymer compound (IV) obtained by polymerizing the compound (A) and the compound (C), as the case of polymer compound (III), the light-emitting layer is preferably formed by using said phosphorescent compound (E) together with polymer compound (IV). In this case, the light-emitting layer desirably comprises the phosphorescent low molecular weight compound (E) in an amount of preferably 1 to 50 parts by weight, more preferably 5 to 20 parts by weight, relative to 100 parts by weight of the polymer compound (IV).

In the case where the light-emitting layer is formed by using polymer compound (I), the method for producing the light-emitting layer is not specifically limited. For example, the light-emitting layer can be produced as follows. First, a solution is prepared by dissolving polymer compound (I) and said electron transport compound where necessary. The solvent used for preparing the solution is exemplified by, although not specifically limited to, a chlorinated solvent such as chloroform, methylene chloride and dichloroethane, an ether type solvent such as tetrahydrofuran and anisole, an aromatic hydrocarbon solvent such as toluene and xylene, a ketones solvent such as acetone and methyl ethyl ketone, an esters solvent such as ethyl acetate, butyl acetate and ethyl cellusolve acetate, and the like. Next, using the solution thus prepared, a film is formed on a substrate by wet film-forming method such as spin coating method, casting method, microgravure coating method, gravure coating method, bar coating method, roll coating method, wire bar coating method, dip coating method, spray coating method, screen printing method, flexo printing method, offset printing method, inkjet printing method and the like. Although the suitable concentration depends on the compound used, the film forming conditions and the like, for example, in the case of spin coating method and dip coating method, said solution preferably contains 0.5 wt % to 5 wt % of polymer compound (I). When said electron transport compound is used, the solution preferably contains 0.1 wt % to 3 wt % of said compound. In the case where a light-emitting layer is formed by using polymer compound (II), the light-emitting layer can be formed in the same manner as described for polymer compound (I).

In the case where the light-emitting layer is formed by using polymer compound (III), first, a solution is prepared by dissolving polymer compound (III), a phosphorescent compound (E), and said electron transport compound where necessary. The solvent used for preparing the solution is the same as above. Next, using the solution thus prepared, a film is formed on a substrate in the same manner as above. Although the suitable concentration depends on the compound used, the film forming conditions and the like, for example, in the case of spin coating method and dip coating method, said solution preferably contains 0.5 wt % to 5 wt % of polymer compound (III) and 0.01 wt % to 2 wt % of the phosphorescent compound (E). When said electron transport compound is used, the solution preferably contains 0.1 wt % to 3 wt % of said compound. In the case where the light-emitting layer is formed using polymer compound (IV), the light-emitting layer can be formed in the same manner as described for polymer compound (III).

2. Organic Light-Emitting Device

The organic light-emitting device relating to the present invention comprises at least one organic layer sandwiched between an anode and a cathode, wherein the specific light-emitting layer described above is contained in at least one of the organic layers. According to the present invention, the light-emitting layer can be formed in a film by simple coating method as mentioned above and devices with large area can be produced.

An example of the configuration of the organic light-emitting device relating to the present invention is shown in FIG. 1, but the configuration of the organic light-emitting device relating to the present invention is not limited by this example. In FIG. 1, a hole transport layer (3), said light-emitting layer (4), and an electron transport layer (5) are provided in this order between an anode (2) provided on a transparent substrate (1) and a cathode (6). In said organic light-emitting device, for example, either 1) hole transport layer/said light-emitting layer or 2) said light-emitting layer/electron transport layer may be provided between the anode (2) and the cathode (6). In addition, there may be provided only any one layer of 3) a layer comprising a hole transport material, a light-emitting material, and an electron transport material, 4) a layer comprising a hole transport material and a light-emitting material, 5) a layer comprising a light-emitting material and an electron transport material, and 6) said light-emitting layer. Furthermore, two or more of said light-emitting layers may be laminated.

With a device as described above, when said light-emitting layer has a hole transport property, an electron transport property, and a phosphorescent property, even if no other layer made of organic material is provided, an organic light-emitting device having high luminous efficiency and durability can be produced. In addition, the production process can be further simplified.

Each of said layers may be formed with a polymer material and the like mixed as a binder. As said polymer material, there may be mentioned, for example, poly(methyl methacrylate), polycarbonate, polyester, polysulfone, polyphenyleneoxide, and the like.

As for the hole transport material and the electron transport material used in each of the above-described layers, each single material may form each layer or materials having different functions may be mixed to form each layer. The light-emitting layer in the organic light-emitting device relating to the present invention may also contain another hole transport material and/or electron transport material in addition to the polymer compound relating to the present invention for the purpose of supplementing the carrier transport property. Such a transporting material may be either a low molecular weight compound or a polymer.

As the hole transport material that forms said hole transport layer or the hole transport material that is mixed into the light-emitting layer, there may be mentioned, for example, TPD (N,N'-dimethyl-N,N'-3-methylphenyl)-1,1'-biphenyl-4,4'-diamine); α-NPD (4,4'-bis[N-(1-naphthyl)-N-phenylamino]biphenyl); a low molecular weight triphenylamine derivative such as m-MTDATA (4,4',4''-tris[3-methylphenyl(phenyl)amino]triphenylamine) and the like; polyvinylcarbazole; a polymer obtained by polymerizing a monomer in which a polymerizable functional group is introduced into said triphenylamine derivative; a fluorescent light-emitting polymer such as poly(p-phenylenevinylene) and polydialkylfluorene; and the like. As said polymer, there may be mentioned, for example, a polymer having a triphenylamine skeleton disclosed in JP-A-H8-157575. Said hole transport materials may be used alone or as a mixture of two or more kinds thereof. Different hole transport materials may be laminated. Although the preferred range for the thickness of the hole transport layer depends on the conductivity of the hole transport layer or the like, typically, the thickness is preferably 1 nm to 5 μm, more preferably 5 nm to 1 μm, particularly preferably 10 nm to 500 nm.

As the electron transport material that forms said electron transport layer or the electron transport material that is mixed into the light-emitting layer, there may be mentioned, for example, a low molecular weight compound including a metal complex of a quinolinol derivative such as Alq3 (aluminum trisquinolinolate), an oxadiazole derivative, a triazole derivative, an imidazole derivative, a triazine derivative, a triarylborane derivative and the like; and a polymer obtained by polymerizing a monomer in which a polymerizable substituent is introduced into said low molecular weight compound. As said polymer, there may be mentioned, for example, poly PBD disclosed in Japanese Patent JP-A-H10-1665. Said electron transport materials may be used alone or as a mixture of two or more kinds thereof. Different electron transport materials may be laminated. Although the preferred range for the thickness of the electron transport layer depends on the conductivity of the electron transport layer, typically, the thickness is preferably 1 nm to 5 μm, more preferably 5 nm to 1 μm, particularly preferably 10 nm to 500 nm.

Furthermore, a hole-block layer may be provided adjacent to the cathode side of the light-emitting layer in order to prevent holes from passing through the light-emitting layer and to recombine holes and electrons efficiently in the light-emitting layer. Said hole-block layer may be formed by using a publicly known material such as a triazole derivative, an oxadiazole derivative, a phenanthroline derivative, and the like.

Between the anode and the hole transport layer or between the anode and the organic layer laminated adjacent to the anode, a buffer layer may be provided to reduce the injection barrier in hole injection. Said buffer layer may be formed by using a publicly known material such as copper phthalocyanine, a mixture of polyethylenedioxythiophene and polystyrenesulfonic acid (PEDOT:PSS), and the like.

Between the cathode and the electron transport layer or between the cathode and the organic layer laminated adjacent to the cathode, an insulating layer having a thickness of 0.1 nm to 10 nm may be provided to improve the efficiency of electron injection. Said insulating layer may be formed by using a publicly known material such as lithium fluoride, sodium fluoride, magnesium fluoride, magnesium oxide, alumina, and the like.

As the anode material used for the organic light-emitting device relating to the present invention, one may suitably use a publicly known transparent conductive material, for example, ITO (indium tin oxide), tin oxide, zinc oxide, a conductive polymer such as polythiophene, polypyrrole and polyaniline, and the like. The surface resistance of the electrode formed by the transparent conductive material is preferably 1 Ω/□ (ohm/square) to 50 Ω/□. The thickness of the anode is preferably 50 nm to 300 nm.

As the cathode material used for the organic light-emitting device relating to the present invention, one may suitably use a publicly known cathode material, for example, an alkaline metal such as Li, Na, K, Cs and the like; an alkaline earth metal such as Mg, Ca, Ba and the like; Al; MgAg alloy; an alloy of Al and an alkaline metal or an alkaline earth metal such as AlLi and AlCa; and the like. The thickness of the cathode is preferably 10 nm to 1 μm, more preferably 50 nm to 500 nm. When a highly active metal such as an alkaline metal, an alkaline earth metal and the like is used, the thickness of the cathode is preferably 0.1 nm to 100 nm, more preferably 0.5 nm to 50 nm. Further, in this case, a metal layer stable to air is laminated on the cathode for the purpose of protecting said cathode metal. As a metal forming said metal layer, there may be mentioned, for example, Al, Ag, Au, Pt, Cu, Ni, Cr and the like. The thickness of said metal layer is preferably 10 nm to 1 μm, more preferably 50 nm to 500 nm.

As the substrate of the organic light-emitting device relating to the present invention, one may suitably use an insulating substrate transparent at the emission wavelength of said light-emitting material. Specifically, there are used transparent plastics such as PET (polyethylene terephthalate) and polycarbonate as well as glass.

As the film forming method of the hole transport layer and the electron transport layer, there may be used, for example, wet film-forming method such as spin coating method, casting method, microgravure coating method, gravure coating method, bar coating method, roll coating method, wire bar coating method, dip coating method, spray coating method, screen printing method, flexo printing method, offset printing method, inkjet printing method and the like, as well as dry film-forming method such as resistance heating vapor deposition method, electron beam vapor deposition method, sputtering method and the like. In the case of a low molecular weight compound, dry film-forming method is suitably employed, while in the case of a polymer, wet film-forming method is suitably employed.

As the film-forming method of said anode material, there is used, for example, electron beam vapor deposition method, sputtering method, chemical reaction method and coating method and the like. As the film-forming method of said cathode material, there is used, for example, resistance heating vapor deposition method, electron beam vapor deposition method, sputtering method, ion plating method and the like.

3. Use

The organic light-emitting device relating to the present invention is suitably used for an image display devices by forming pixels in a matrix system or in a segment system by a publicly known method. In addition, said organic light-emitting device is also suitably used as a area light source without forming pixels.

Specifically, the organic light-emitting device relating to the present invention is suitably used for displays, backlights, electrophotographs, illumination light sources, recording light sources, exposure light sources, read-out light sources, indicators, signboards, interior goods, optical communication and the like.

EXAMPLES

Hereinafter, the present invention will be explained more specifically based on Examples, but the present invention is not limited to these Examples.

Molecular weight measurements and composition analyses of the polymer compounds were performed by the following methods.

(1) Molecular Weight

Molecular weights were determined by using a gel permeation chromatography (GPC) instrument under the following conditions.

Columns: Shodex KF-G+KF804L+KF802+KF801
Eluent: Tetrahydrofuran (THF)
Temperature: 40° C.
Detector: RI (Shodex RI-71)

(2) Composition Analysis $^{13}C$-NMR spectra were measured under the following conditions.

Instrument: JNM EX270 manufactured by JEOL Ltd.
67.5 MHz
Solvent: Deuteriochloroform ICP elemental analyses were performed under the following conditions.

Instrument: ICPS 8000 manufactured by Shimadzu Corporation Emission external quantum efficiency, maximum brightness and half-life of brightness of the device obtained were measured under the following conditions.

(3) Emission External Quantum Efficiency

The produced organic light-emitting device was placed in a dark place and a spectroradiometer (CS-1000T, manufactured by Konica Minolta Holdings, Inc.) was located at 100 cm away to the direction perpendicular to the light-emitting surface. A given voltage was applied to the organic light-emitting device for 1 sec to bring about emission, and the value of current running through the device, the value of front brightness observed from the anode side of the device, and the emission spectrum were measured at a viewing angle of 0.2 degree. The applied voltage was increased stepwise from 0 V with an increment of 0.1 V, and the current value, the brightness value and the emission spectrum were measured immediately after the voltage was increased. The emission external quantum efficiencies were calculated from these measurements, and the maximum value was recorded as the emission external quantum efficiency of the device.

(4) Maximum Brightness

The values of front brightness of the produced organic light-emitting device were measured in the same manner as that in the above-mentioned measurement of the emission external quantum efficiency except that the increment of the applied voltage was set at 0.5 V, and the maximum of the observed values was recorded as the maximum brightness of the device.

(5) Half-Life of Brightness

While the value of front brightness of the produced organic light-emitting device was measured in the same manner as that in the above-mentioned measurement of the emission external quantum efficiency, current was applied to the device so that the brightness value became 100 cd/m². A silicon photodiode was kept in close contact with the anode side of the device and the photocurrent of the photodiode was monitored while constant current was applied to the device. The time at which the photocurrent value was decreased to half of its initial value was recorded as the half-life of brightness.

Synthesis Example 1

Synthesis of Compound (F)

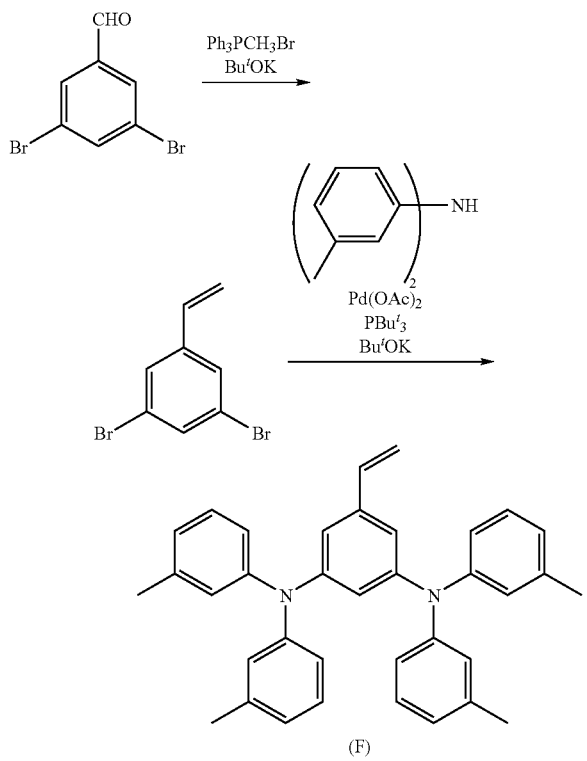

Tetrahydrofuran (20 mL) was added to methyltriphenylphosphonium bromide (3.150 g, 8.8 mmol). Then potassium t-butoxide (0.989 g, 8.8 mmol) was added herein small portions with ice-cooling, and the mixture was stirred at room temperature for 1 hr. The resultant slurry was cooled to −78° C. and a tetrahydrofuran (20 mL) solution containing 3,5-dibromobenzaldehyde (1.519 g, 5.8 mmol) was added dropwise. The reaction solution was allowed to warm to room temperature and stirred for 1 hr, and then a saturated ammonium chloride aqueous solution was added to the reaction solution. The product was extracted with ethyl acetate, the solvent was distilled off under reduced pressure, and the residue was purified with silica-gel column chromatography to obtain 3,5-dibromostyrene (1.2 g, 4.6 mmol).

Next, a mixture of 3,5-dibromostyrene (0.74 g, 2.8 mmol), di-m-tolylamine (1.11 g, 5.6 mmol), palladium acetate (0.038 g, 0.17 mmol), tri-t-butylphosphine (0.17 g, 0.84 mmol), potassium t-butoxide (0.65 g, 5.8 mmol) and toluene (20 mL) was heated under reflux for 3.5 hr. After the resultant reaction solution was filtered through celite, the solvent was distilled off under reduced pressure, and the residue was purified with silica-gel column chromatography to obtain compound (F) (1.33 g, 2.7 mmol).

Data for identification of compound (F) are as follows.

Elemental analysis: Calculated value ($C_{36}H_{34}N_2$) C, 87.41; H, 6.93; N, 5.66.

Measured value C, 87.15; H, 7.02; N, 5.81

Mass spectrometry (EI): 494 ($M^+$)

Synthesis Example 2

Synthesis of Compound (H)

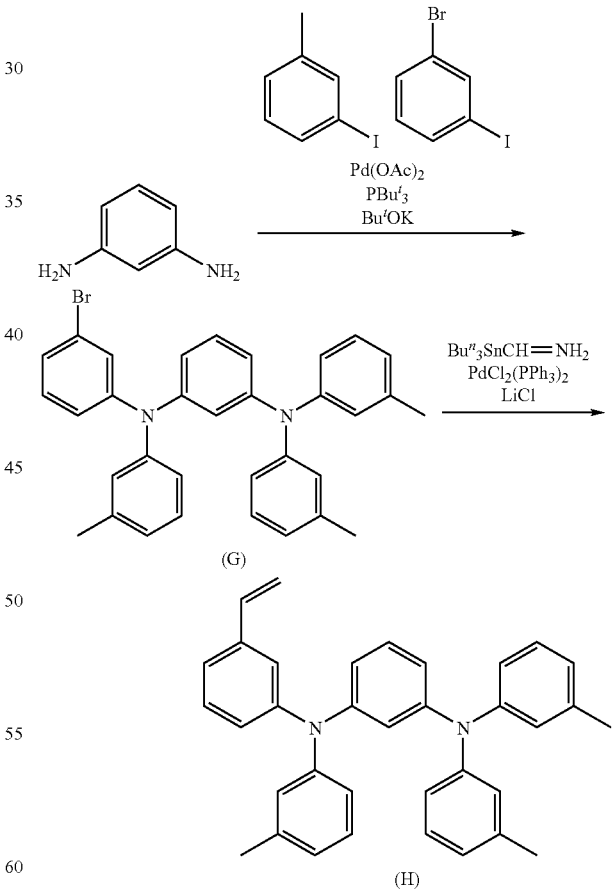

A mixture of m-phenylenediamine (20 g, 0.18 mol), 3-iodotoluene (81 g, 0.37 mol), palladium acetate (0.50 g, 2.2 mmol), tri-t-butylphosphine (1.4 g, 6.9 mmol), potassium t-butoxide (45 g, 0.40 mol), and xylene (300 mL) was heated under reflux for 3 hr. After the resultant reaction solution was cooled to room temperature, 3-iodotoluene (40 g, 0.18 mol) and 3-bromoiodobenzene (52 g, 0.18 mol) were added and then the solution was further heated under reflux for 3 hr. After the resultant reaction solution was filtered, the solvent was distilled off under reduced pressure. The residue was purified with silica-gel column chromatography to obtain compound (G) (2.7 g, 5.1 mmol).

Next, a mixture of compound (G) (2.0 g, 3.7 mmol), tri-n-butyl(vinyl)tin (1.3 g, 4.1 mmol), dichlorobis(triphenylphosphine)palladium (0.10 g, 0.14 mmol), lithium chloride (0.17 g, 4.0 mmol), and toluene (30 mL) was heated under reflux for 4 hr. The resultant reaction mixture was filtered to remove insoluble materials and the solvent was distilled off under reduced pressure. The residue was purified with silica-gel column chromatography to obtain compound (H) (1.5 g, 3.1 mmol).

Data for identification of compound (H) are as follows.

Elemental analysis: Calculated value ($C_{35}H_{32}N_2$) C, 87.46; H, 6.71; N, 5.83.

Measured value C, 87.59; H, 6.91; N, 5.50

Mass spectrometry (EI): 480 ($M^+$)

In Examples and Comparative Examples, the following compounds (I) to (Q) were also used.

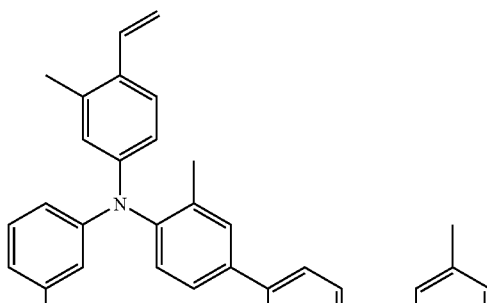
(I)

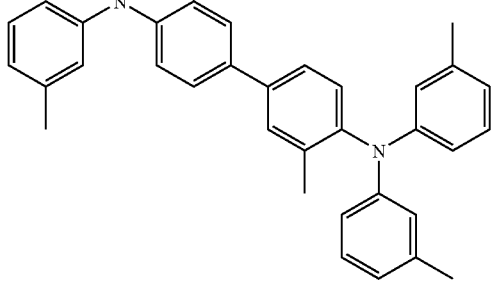
(J)

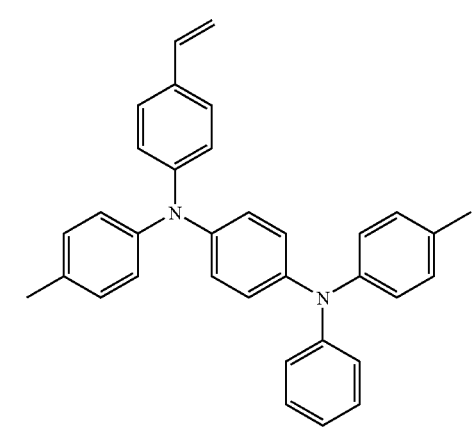

(K)

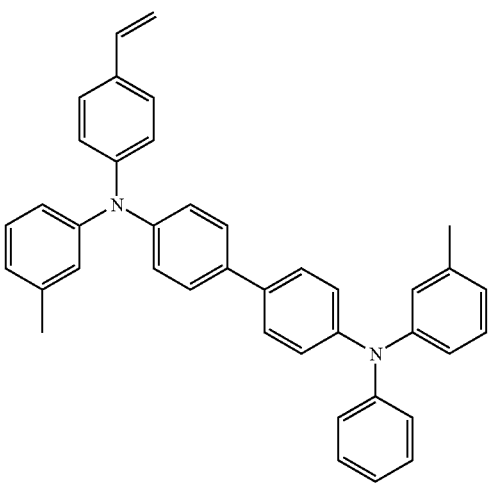
(L)

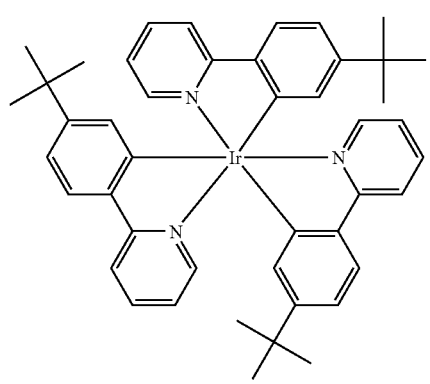
(M)

(O)

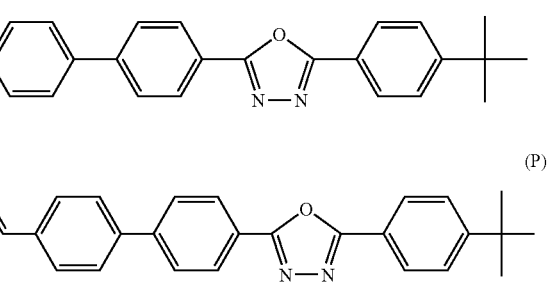
(P)

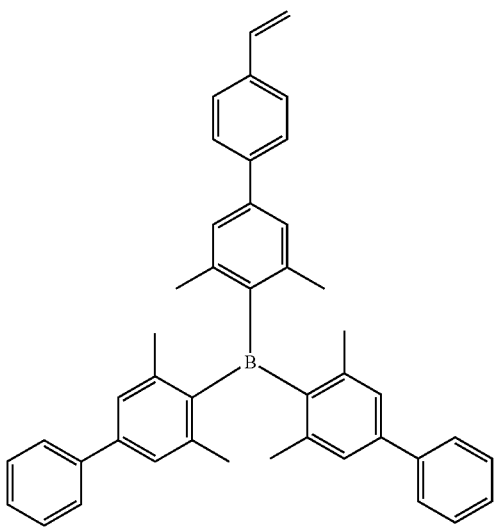

(Q)

Example 1

Synthesis of Polymer Compound (1-1)

Compound (F) (460 mg) and iridium complex (M) (80 mg) were put in a closed vessel, and dehydrated toluene (5.0 mL) was added here. Next, a toluene (0.1 M, 0.10 mL) solution containing V-601 (Wako Pure Chemical Industries Ltd.) was added, and the content was deaerated by carrying out five freeze-pump-thaw cycles. The vessel was sealed with the vacuum condition kept and the reaction solution was stirred at 60° C. for 60 hr. After the reaction was completed, the reaction solution was added dropwise to acetone (200 mL) to obtain precipitate. The precipitate was purified twice by re-precipitation with toluene-acetone and dried at 50° C. in vacuum overnight to obtain polymer compound (1-1). The weight average molecular weight (Mw) of polymer compound (1-1) was 50200 and its molecular distribution index (Mw/Mn) was 2.19. The value of m/(m+n) in the polymer compound was 0.10 which was estimated from the results of ICP elemental analysis and $^{13}$C-NMR measurement.

Example 2

Synthesis of Polymer Compound (2-1)

Compound (F) (460 mg), iridium complex (M) (80 mg) and compound (Q) (460 mg) were put in a closed vessel, and dehydrated toluene (9.9 mL) was added here. Next, a toluene (0.1 M, 198 µL) solution containing V-601 (Wako Pure Chemical Industries Ltd.) was added, and the content was deaerated by carrying out five freeze-pump-thaw cycles. The vessel was sealed with the vacuum condition kept and the reaction solution was stirred at 60° C. for 60 hr. After the reaction was completed, the reaction solution was added dropwise to acetone (500 mL) to obtain precipitate. The precipitate was purified twice by re-precipitation with toluene-acetone and then dried at 50° C. in vacuum overnight to obtain polymer compound (2-1). The weight average molecular weight (Mw) of polymer compound (2-1) was 48000 and its molecular distribution index (Mw/Mn) was 1.95. The value of m/(m+n) in the polymer compound was 0.055 which was estimated from the results of ICP elemental analysis and $^{13}$C-NMR measurement. In polymer compound (2-1), the value of x/n was 0.54 and the value of y/n was 0.46.

Example 3

Synthesis of Polymer Compound (3-1)

Compound (H) (460 mg) and compound (P) (460 mg) were put in a closed vessel, and dehydrated toluene (9.9 mL) was added here. Next, a toluene (0.1 M, 198 µL) solution containing V-601 (Wako Pure Chemical Industries Ltd.) was added, and the content was deaerated by carrying out five freeze-pump-thaw cycles. The vessel was sealed with the vacuum condition kept and the reaction solution was stirred at 60° C. for 60 hr. After the reaction was completed, the reaction solution was added dropwise to acetone (500 mL) to obtain precipitate. The precipitate was purified twice by re-precipitation with toluene-acetone and then dried at 50° C. in vacuum overnight to obtain polymer compound (3-1). The weight average molecular weight (Mw) of polymer compound (3-1) was 49200 and its molecular distribution index (Mw/Mn) was 1.89. The value of x/n in polymer compound was 0.44 and the value of y/n was 0.56, which were estimated from the results of ICP elemental analysis and $^{13}$C-NMR measurement.

Comparative Example 1

Synthesis of Polymer Compound (1-2)

Polymer compound (1-2) was obtained in the same way as Example 1 except that polymerizable compound (I) was used instead of compound (F). The weight average molecular weight (Mw) of polymer compound (1-2) was 46300 and its molecular distribution index (Mw/Mn) was 2.07. The value of m/(m+n) in the polymer compound was 0.12 which was estimated from the results of ICP elemental analysis and $^{13}$C-NMR measurement.

Comparative Example 2

Synthesis of Polymer Compound (2-2)

Polymer compound (2-2) was obtained in the same way as Example 2 except that compound (J) was used instead of compound (F). The weight average molecular weight (Mw) of polymer compound (2-2) was 46400 and its molecular distribution index (Mw/Mn) was 2.02. The value of m/(m+n) in the polymer compound was 0.050 which was estimated from the results of ICP elemental analysis and $^{13}$C-NMR measurement. In polymer compound (2-2), the value of x/n was 0.49 and the value of y/n was 0.51.

Comparative Example 3

Synthesis of Polymer Compound (3-2)

Polymer compound (3-2) was obtained in the same way as Example 3 except that compound (K) was used instead of compound (H). The weight average molecular weight (Mw) of polymer compound (3-2) was 52000 and its molecular distribution index (Mw/Mn) was 1.96. The value of x/n in polymer compound was 0.41 and the value of y/n was 0.59 which were estimated from the results of ICP elemental analysis and $^{13}$C-NMR measurement.

Example 4

Production and Evaluation of an Organic Light-Emitting Device

An ITO-attached substrate (Nippo Electric Co., Ltd.) was used. This was a substrate in which two lines of ITO (indium tin oxide) electrode (anode) of a width of 4 mm were fabricated in a stripe pattern on one surface of a 25 mm-square glass substrate.

First, the above-mentioned ITO-attached substrate was coated with poly(3,4-ethylenedioxythiophene)-polystyrene-sulfonic acid (product name, BaytronP, manufactured by Bayer Co., Ltd.,) by spin-coating method with a rotation speed of 3500 rpm and a coating time of 40 sec. Then the coated substrate was dried in a vacuum desiccator under reduced pressure at 60° C. for 2 hr to form an anode buffer layer. The film thickness of the obtained anode buffer layer was approximately 50 nm. Next, polymer compound (1-1) (48.6 mg) and compound (O) (41.4 mg) were dissolved in toluene (2910 mg) (Wako Pure Chemical Industries Ltd., super-high grade) and the resultant solution was filtered through a filter having a pore diameter of 0.2 µm to prepare a coating solution. And then, the anode buffer layer was coated with the coating solution by spin coating method with a rotation speed of 3000 rpm and a coating time of 30 sec. After coating the substrate was dried at room temperature (25° C.) for 30 min to form a light-emitting layer. The film thickness of the obtained light-emitting layer was approximately 100 nm.

Then, the substrate whereon the light-emitting layer was formed was loaded into a deposition chamber. Barium and aluminum were co-deposited with a weight ratio of 1:10 on the substrate so as to form two lines of cathode with a width of 3 mm in a stripe pattern perpendicular to the running direction of the anodes. The film thickness of the obtained cathode was approximately 50 nm.

As the last step, lead wires were attached to the anodes and the cathodes (hard-wiring) in an argon atmosphere to produce four organic EL elements having a length of 4 mm and a width of 3 mm. Voltage was applied to the organic EL elements to bring about emission by using a programmable DC voltage/current generator (TR6143, manufactured by Advantest Corporation).

For the produced organic light-emitting device, the maximum external quantum efficiency, the maximum attainable brightness, and the half-life of brightness at an initial brightness of 100 cd/m$^2$ in constant current driving are shown in Table 1.

Example 5

Production and Evaluation of an Organic Light-Emitting Device

An organic light-emitting device was produced in the same way as Example 4 except that the coating solution used for forming the light-emitting layer was prepared from polymer compound (2-1) (90 mg) and toluene (2910 mg). For the produced organic light-emitting device, the maximum external quantum efficiency, the maximum attainable brightness, and the half-life of brightness at an initial brightness of 100 cd/m$^2$ in constant current driving are shown in Table 1.

Example 6

Production and Evaluation of an Organic Light-Emitting Device

An organic light-emitting device was produced in the same way as Example 4 except that the coating solution used for forming the light-emitting layer was prepared from polymer compound (3-1) (82.8 mg), iridium complex (L) (7.2 mg), and toluene (2910 mg). For the produced organic light-emitting device, the maximum external quantum efficiency, the maximum attainable brightness, and the half-life of brightness at an initial brightness of 100 cd/m$^2$ in constant current driving are shown in Table 1.

Comparative Example 4

Production and Evaluation of an Organic Light-Emitting Device

An organic light-emitting device was produced in the same way as Example 4 except that the coating solution used for forming the light-emitting layer was prepared from polymer compound (1-2) (48.6 mg), compound (O) (41.4 mg), and toluene (2910 mg). For the produced organic light-emitting device, the maximum external quantum efficiency, the maximum attainable brightness, and the half-life of brightness at an initial brightness of 100 cd/m$^2$ in constant current driving are shown in Table 1.

Comparative Example 5

Production and Evaluation of an Organic Light-Emitting Device

An organic light-emitting device was produced in the same way as Example 4 except that the coating solution used forming the light-emitting layer was prepared from polymer compound (2-2) (90 mg) and toluene (2910 mg). For the produced organic light-emitting device, the maximum external quantum efficiency, the maximum attainable brightness and the half-life of brightness at an initial brightness of 100 cd/m$^2$ in constant current driving are shown in Table 1.

Comparative Example 6

Production and Evaluation of an Organic Light-Emitting Device

An organic light-emitting device was produced in the same way as Example 4 except that the coating solution used for forming the light-emitting layer was prepared from polymer compound (3-2) (82.8 mg), iridium complex (L) (7.2 mg), and toluene (2910 mg). For the produced organic light-emitting device, the maximum external quantum efficiency, the maximum attainable brightness, and the half-life of brightness at an initial brightness of 100 cd/m$^2$ in constant current driving are shown in Table 1.

TABLE 1

| | Polymer compound | Low molecular weight compound | Maximum external quantum efficiency (%) | Maximum attainable brightness (cd/m$^2$) | Half-life of brightness (h) |
|---|---|---|---|---|---|
| Example 4 | 1-1 | O | 7.9 | 43000 | 4700 |
| Example 5 | 2-1 | — | 8.6 | 51000 | 5500 |
| Example 6 | 3-1 | L | 8.2 | 45000 | 5100 |
| Comparative Example 4 | 1-2 | O | 6.9 | 29000 | 2600 |
| Comparative Example 5 | 2-2 | — | 5.6 | 26000 | 2100 |
| Comparative Example 6 | 3-2 | L | 6.4 | 30000 | 2800 |

Synthesis Example 3, 4

Synthesis of Compound (R), (S)

Compound (R) was obtained in the same way as Synthesis Example 1 except that di-p-tolylamine was used instead of di-m-tolylamine. Compound (S) was obtained in the same way as Synthesis Example 1 except that di(4-methoxyphenyl)amine was used instead of di-m-tolylamine.

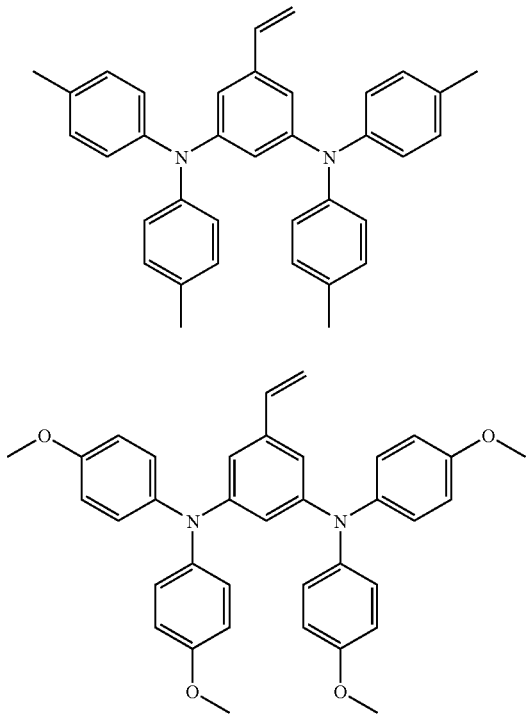

Data for identification of compound (R) are as follows.
Elemental analysis: Calculated value ($C_{36}H_{34}N_2$) C, 87.41; H, 6.93; N, 5.66.
Measured value C, 87.26; H, 6.83; N, 5.90
Mass spectrometry (EI): 494 ($M^+$)
Data for identification of compound (S) are as follows.
Elemental analysis: Calculated value ($C_{36}H_{34}N_2O_4$) C, 77.40; H, 6.13; N, 5.01.
Measured value C, 77.65; H, 6.01; N, 4.97
Mass spectrometry (EI): 558 ($M^+$)

Synthesis Example 5

Synthesis of Compound (U)

Scheme 3

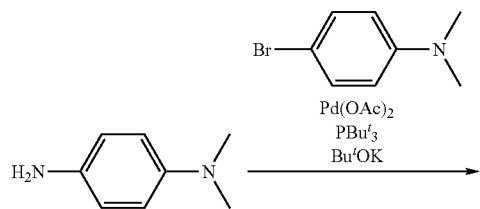

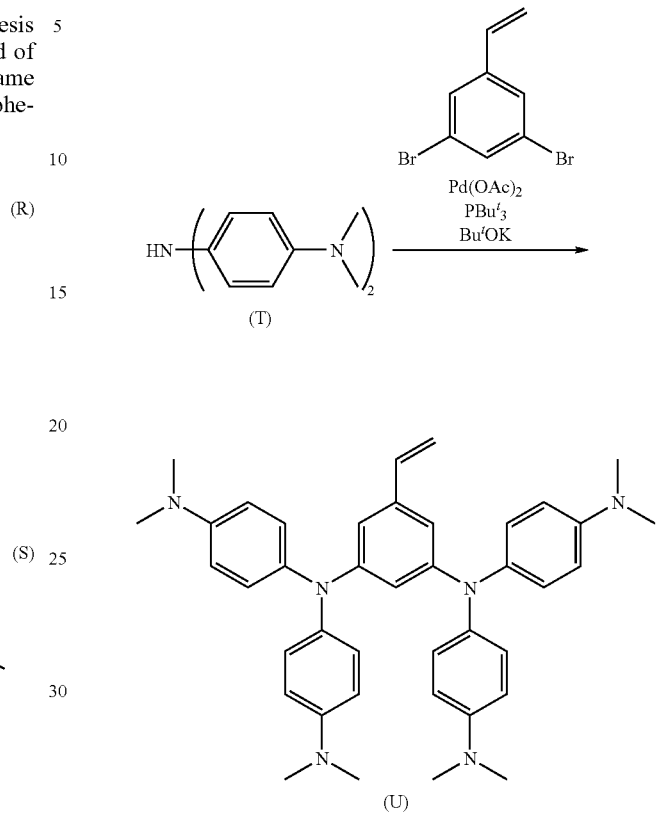

A mixture of 4-amino-N,N,-dimethylaniline (10.0 g, 73 mmol), 4-bromo-N,N-dimethylaniline (15.0 g, 75 mmol), palladium acetate (0.40 g, 1.8 mmol), tri-t-butylphosphine (1.50 g, 7.4 mmol), potassium t-butoxide (10.0 g, 89 mmol) and toluene (200 mL) was heated under reflux for 3 hr. After the resultant reaction solution was filtered through celite, the solvent was distilled off under reduced pressure. The residue was dissolved in ethyl acetate, and was purified with silica-gel column chromatography to obtain intermediate (T).

Next, a mixture of intermediate (T) (0.60 g, 2.3 mmol), 3,5-dibromostyrene (0.30 g, 1.1 mmol), palladium acetate (0.010 g, 0.045 mmol), tri-t-butylphosphine (0.040 g, 0.20 mmol), potassium t-butoxide (0.40 g, 3.6 mmol) and toluene (30 mL) was heated under reflux for 5 hr. After the resultant reaction solution was filtered through celite, the solvent was distilled off under reduced pressure, and the residue was purified with silica-gel column chromatography to obtain compound (U) (0.40 g, 0.65 mmol).

Data for identification of compound (U) are as follows.
Elemental analysis: Calculated value ($C_{40}H_{46}N_6$) C, 78.65; H, 7.59; N, 13.76.
Measured value C, 78.88; H, 7.30; N, 13.49
Mass spectrometry (EI): 610 ($M^+$)

Synthesis Example 6

Synthesis of Compound (W)

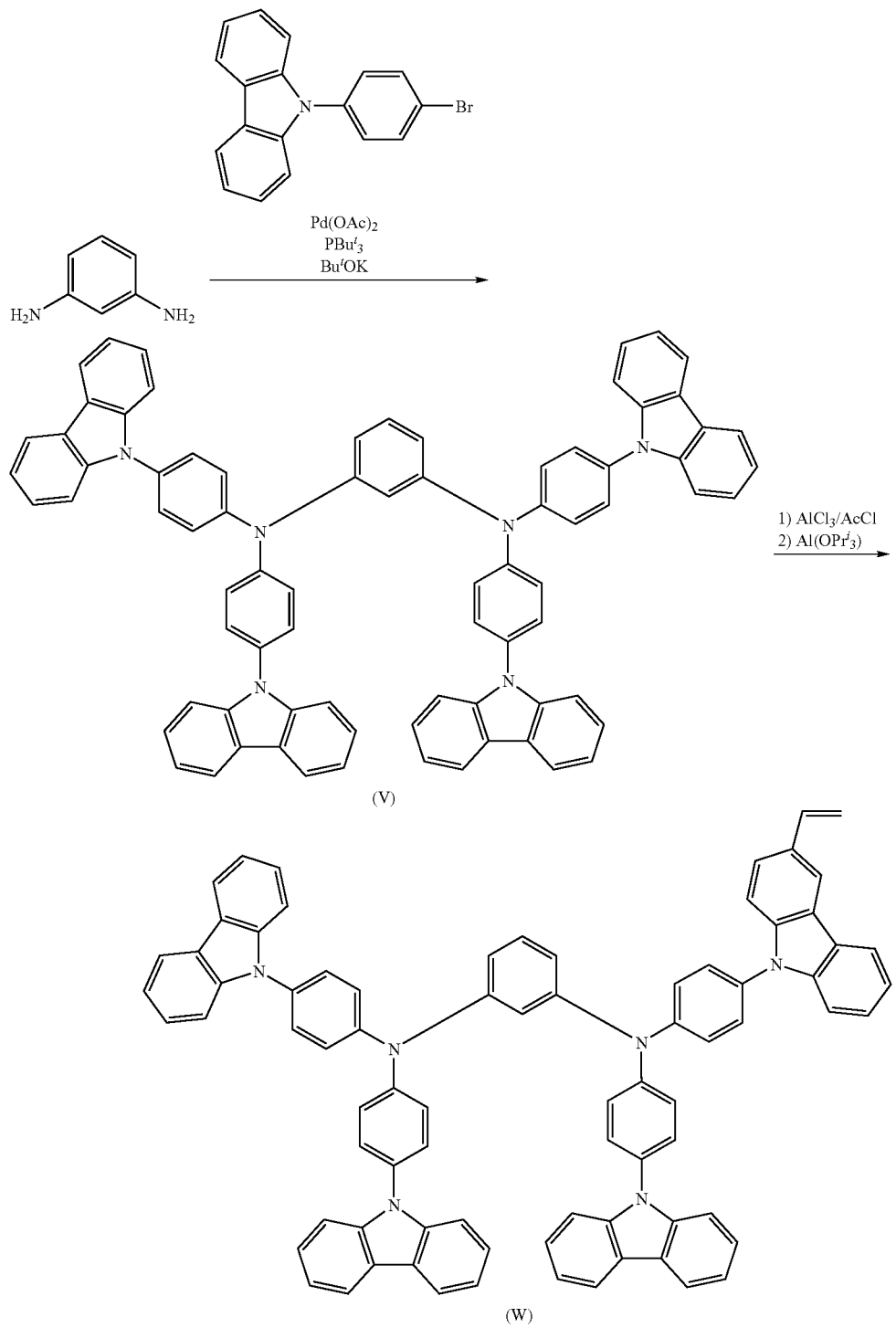

A mixture of 1,3-phenylenediamine (5.0 g, 46 mmol), 9-(4-bromophenyl)carbazole (60 g, 195 mmol), palladium acetate (1.0 g, 4.5 mmol), tri-t-butylphosphine (3.6 g, 18 mmol), potassium t-butoxide (30 g, 267 mmol) and toluene (300 mL) was heated under reflux for 5 hr. After the resultant reaction solution was filtered through celite, the solvent was distilled off under reduced pressure, and the residue was purified with silica-gel column chromatography to obtain intermediate (V).

Next, intermediate (V) (10 g, 9.3 mmol) was dissolved in N,N-dimethylformamide. Acetyl chloride (0.75 g, 9.6 mmol) was added to the resultant reaction solution, and then aluminium chloride (3.0 g, 22 mmol) was added here, and the reaction solution was stirred for 12 hr at room temperature. After the resultant reaction solution was filtered through celite, the solvent was distilled off under reduced pressure, xylene (100 mL) and triisopropoxyaluminium (3.0 g, 15 mmol) was added to the residue, and the resultant reaction solution was heated under reflux for 5 hr. After the resultant reaction solution was filtered through celite, the solvent was distilled off under reduced pressure, and the residue was purified with silica-gel column chromatography to obtain compound (W) (1.2 g, 1.1 mmol).

Data for identification of compound (W) are as follows.

Elemental analysis: Calculated value ($C_{80}H_{54}N_6$) C, 87.40; H, 4.95; N, 7.64.

Measured value C, 87.73; H, 4.85; N, 7.51

Mass spectrometry (EI): 1098 ($M^+$)

In Examples and Comparative Examples, the following compounds (X) to (Z) were also used.

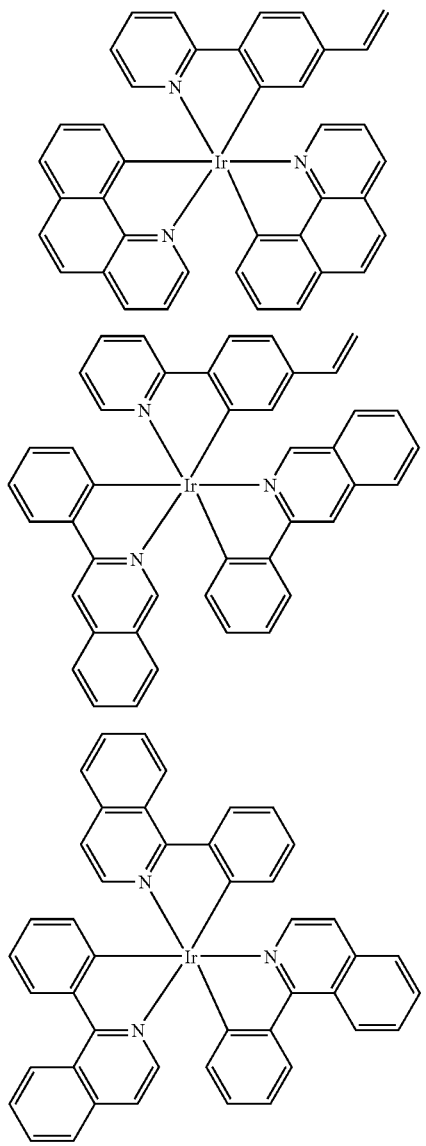

(X)

(Y)

(Z)

Example 7

Synthesis of Polymer Compound (4-1)

Polymer compound (4-1) was obtained in the same way as Example 1 except that compound (R) was used instead of compound (F) and iridium complex (X) was used instead of iridium complex (M). The weight average molecular weight (Mw) of polymer compound (4-1) was 72500 and its molecular distribution index (Mw/Mn) was 1.76. The value of m/(m+n) in the polymer compound was 0.11 which was estimated from the results of ICP elemental analysis and $^{13}$C-NMR measurement.

Example 8

Synthesis of Polymer Compound (5-1)

Polymer compound (5-1) was obtained in the same way as Example 2 except that compound (S) was used instead of compound (F) and iridium complex (Y) was used instead of iridium complex (M). The weight average molecular weight (Mw) of polymer compound (5-1) was 39800 and its molecular distribution index (Mw/Mn) was 2.20. The value of m/(m+n) in the polymer compound was 0.060 which was estimated from the results of ICP elemental analysis and $^{13}$C-NMR measurement. In polymer compound (5-1), the value of x/n was 0.52 and the value of y/n was 0.48.

Example 9

Synthesis of Polymer Compound (6-1)

Polymer compound (6-1) was obtained in the same way as Example 3 except that compound (W) was used instead of compound (H) and iridium complex (Q) was used instead of iridium complex (P). The weight average molecular weight (Mw) of polymer compound (6-1) was 48400 and its molecular distribution index (Mw/Mn) was 2.55. In polymer compound (6-1), the value of x/n was 0.38 and the value of y/n was 0.62.

Comparative Example 7

Synthesis of Polymer Compound (4-2)

Polymer compound (4-2) was obtained in the same way as Example 1 except that polymerizable compound (I) was used instead of compound (F) and iridium complex (X) was used instead of iridium complex (M). The weight average molecular weight (Mw) of polymer compound (4-2) was 63700 and its molecular distribution index (Mw/Mn) was 2.04. The value of m/(m+n) in the polymer compound was 0.12 which was estimated from the results of ICP elemental analysis and $^{13}$C-NMR measurement.

Comparative Example 8

Synthesis of Polymer Compound (5-2)

Polymer compound (5-2) was obtained in the same way as Example 2 except that compound (J) was used instead of compound (F) and iridium complex (Y) was used instead of iridium complex (M). The weight average molecular weight (Mw) of polymer compound (5-2) was 48000 and its molecular distribution index (Mw/Mn) was 2.15. The value of m/(m+n) in the polymer compound was 0.065 which was estimated from the results of ICP elemental analysis and $^{13}$C-NMR measurement. In polymer compound (5-2), the value of x/n was 0.53 and the value of y/n was 0.47.

Comparative Example 9

Synthesis of Polymer Compound (6-2)

Polymer compound (6-2) was obtained in the same way as Example 3 except that compound (K) was used instead of compound (H) and iridium complex (Q) was used instead of iridium complex (P). The weight average molecular weight (Mw) of polymer compound (6-2) was 59200 and its molecular distribution index (Mw/Mn) was 2.31. In polymer compound (6-2), the value of x/n was 0.50 and the value of y/n was 0.50.

Example 10

Production and Evaluation of an Organic Light-Emitting Device

An organic light-emitting device was produced in the same way as Example 4 except that the coating solution used for forming the light-emitting layer was prepared from polymer compound (4-1) (48.6 mg), compound (O) (41.4 mg) and toluene (2910 mg). The produced organic light-emitting device exhibited yellow light emission. For the produced organic light-emitting device, the maximum external quantum efficiency, the maximum attainable brightness, and the half-life of brightness at an initial brightness of 100 cd/m$^2$ in constant current driving are shown in Table 2.

Example 11

Production and Evaluation of an Organic Light-Emitting Device

An organic light-emitting device was produced in the same way as Example 4 except that the coating solution used for forming the light-emitting layer was prepared from polymer compound (5-1) (90 mg) and toluene (2910 mg). The produced organic light-emitting device exhibited orange light emission. For the produced organic light-emitting device, the maximum external quantum efficiency, the maximum attainable brightness, and the half-life of brightness at an initial brightness of 100 cd/m$^2$ in constant current driving are shown in Table 2.

Example 12

Production and Evaluation of an Organic Light-Emitting Device

An organic light-emitting device was produced in the same way as Example 4 except that the coating solution used for forming the light-emitting layer was prepared from polymer compound (6-1) (82.8 mg), iridium complex (Z) (7.2 mg) and toluene (2910 mg). The produced organic light-emitting device exhibited red light emission. For the produced organic light-emitting device, the maximum external quantum efficiency, the maximum attainable brightness, and the half-life of brightness at an initial brightness of 100 cd/m$^2$ in constant current driving are shown in Table 2.

Comparative Example 10

Production and Evaluation of an Organic Light-Emitting Device

An organic light-emitting device was produced in the same way as Example 4 except that the coating solution used for forming the light-emitting layer was prepared from polymer compound (4-2) (48.6 mg), compound (O) (41.4 mg) and toluene (2910 mg). The produced organic light-emitting device exhibited yellow light emission. For the produced organic light-emitting device, the maximum external quantum efficiency, the maximum attainable brightness, and the half-life of brightness at an initial brightness of 100 cd/m$^2$ in constant current driving are shown in Table 2.

Comparative Example 11

Production and Evaluation of an Organic Light-Emitting Device

An organic light-emitting device was produced in the same way as Example 4 except that the coating solution used for forming the light-emitting layer was prepared from polymer compound (5-2) (90 mg) and toluene (2910 mg). The produced organic light-emitting device exhibited orange light emission. For the produced organic light-emitting device, the maximum external quantum efficiency, the maximum attainable brightness, and the half-life of brightness at an initial brightness of 100 cd/m$^2$ in constant current driving are shown in Table 2.

Comparative Example 12

Production and Evaluation of an Organic Light-Emitting Device

An organic light-emitting device was produced in the same way as Example 4 except that the coating solution used for forming the light-emitting layer was prepared from polymer compound (6-2) (82.8 mg), iridium complex (Z) (7.2 mg) and toluene (2910 mg). The produced organic light-emitting device exhibited red light emission. For the produced organic light-emitting device, the maximum external quantum efficiency, the maximum attainable brightness, and the half-life of brightness at an initial brightness of 100 cd/m$^2$ in constant current driving are shown in Table 2.

TABLE 2

|  | Polymer compound | Low molecular weight compound | Maximum external quantum efficiency (%) | Maximum attainable brightness (cd/m$^2$) | Half-life of brightness (h) |
| --- | --- | --- | --- | --- | --- |
| Example 10 | 4-1 | O | 6.4 | 69000 | 3500 |
| Example 11 | 5-1 | — | 7.3 | 45000 | 4100 |
| Example 12 | 6-1 | Z | 7.0 | 35000 | 7000 |
| Comparative Example 10 | 4-2 | O | 3.6 | 26000 | 900 |
| Comparative Example 11 | 5-2 | — | 4.8 | 30000 | 1900 |
| Comparative Example 12 | 6-2 | Z | 3.1 | 12000 | 2500 |

Synthesis Example 7

Synthesis of compound (AB)

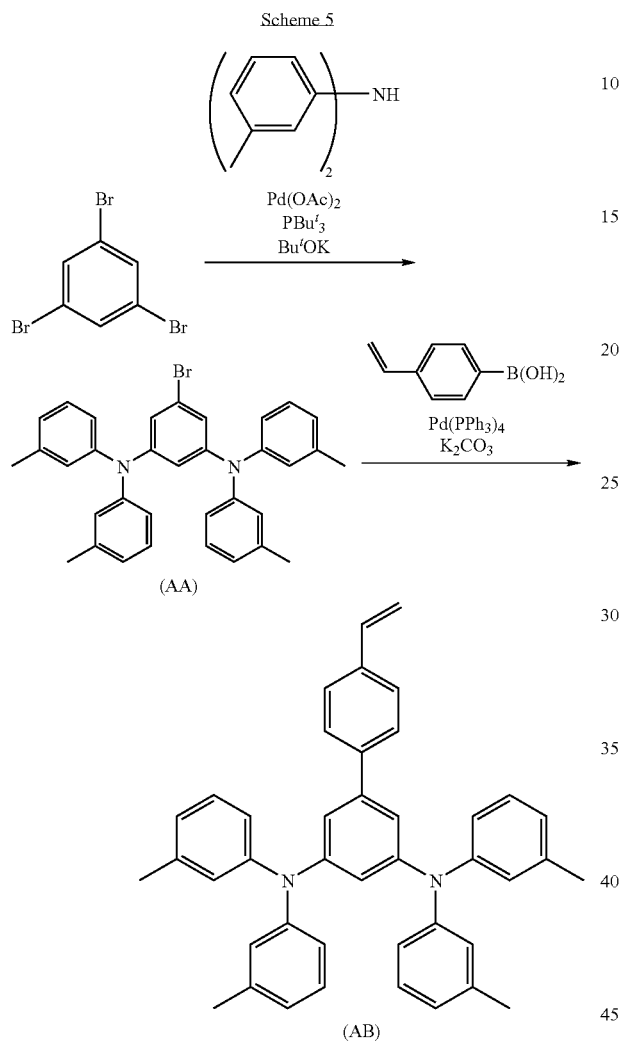

A mixture of 1,3,5-tribromobenzene (10.0 g, 32 mmol), di-m-torylamine (12.5 g, 63 mmol), palladium acetate (0.30 g, 1.4 mmol), tri-t-butylphosphine (1.15 g, 5.7 mmol), potassium t-butoxide (8.0 g, 71 mol), and toluene (200 mL) was heated under reflux for 3.5 hr. After the resultant reaction solution was filtered through celite, the solvent was distilled off under reduced pressure, and the residue was purified with silica-gel column chromatography to obtain compound (AA). Next, a mixture of compound (AA) (2.5 g, 4.6 mmol), 4-vinylphenyl boronic acid (0.68 g, 4.6 mmol), tetrakis(triphenylphosphine)palladium (0.10 g, 0.087 mmol), 1,2-dimethoxyethane (50 mL) and 20 mL of an aqueous solution of potassium carbonate (2.0 g, 14.5 mmol) was heated under reflux for 2 hr. The organic layer was extracted with ethyl acetate from the resultant reaction solution. After the extract was dried by magnesium sulfate, the solvent was distilled off under reduced pressure. The crude product was purified with silica-gel column chromatography to obtain compound (AB) (2.2 g, 3.9 mmol).

Data for identification of compound (AB) are as follows.
Elemental analysis: Calculated value ($C_{42}H_{38}N_2$) C, 88.38; H, 6.71; N, 4.91.
Measured value C, 88.55; H, 6.49; N, 4.73
Mass spectrometry (EI): 570 ($M^+$)

Synthesis Example 8

Synthesis of Compound (AD)

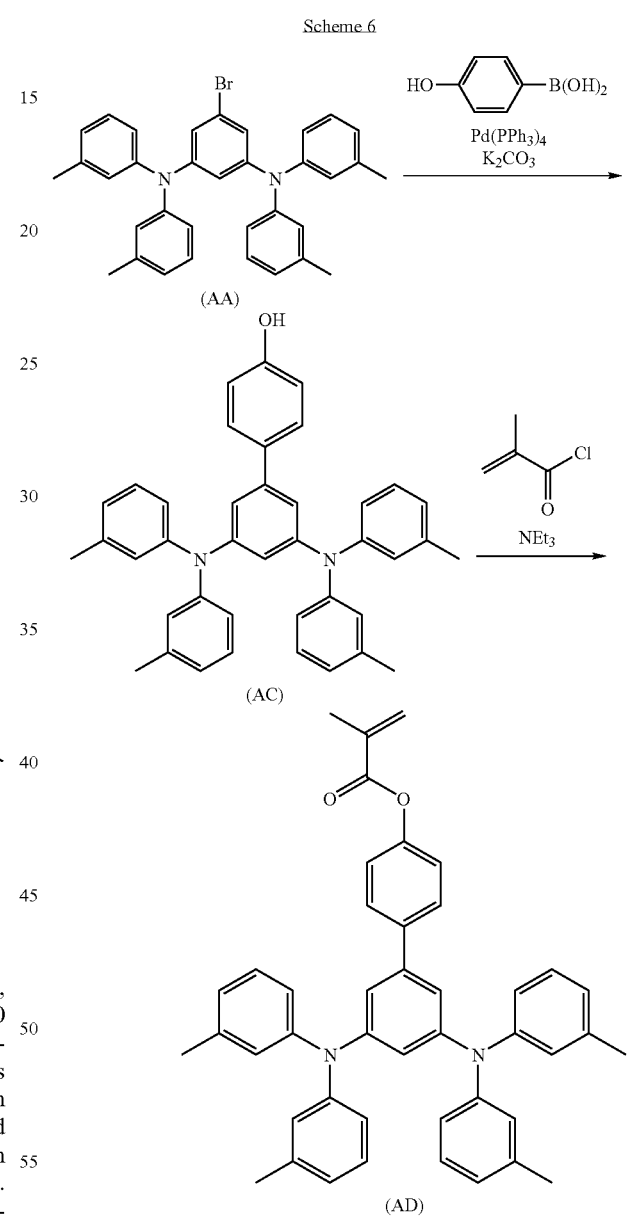

A mixture of compound (AA) (2.5 g, 4.6 mmol), 4-hydroxyphenyl boronic acid (0.65 g, 4.7 mmol), tetrakis(triphenylphosphine)palladium (0.10 g, 0.087 mmol), 1,2-dimethoxyethane (50 mL) and 20 mL of an aqueous solution of potassium carbonate (2.0 g, 14.5 mmol) was heated under reflux for 2 hr, and then 1N aqueous hydrochloric acid was added to the reaction solution. After the organic layer was extracted with ethyl acetate, the extract was dried by magnesium sulfate, and then the solvent was distilled off under reduced pressure. The crude product was purified with silica-gel column chromatography to obtain compound (AC). Next, compound (AC) (1.5 g, 2.7 mmol) was dissolved in dichloromethane (50 mL), triethylamine (0.40 g, 4.0 mmol) was added to here, and then 5 mL of a dichloromethane solution of methacryloyl chloride (0.36 g, 3.4 mmol) was added dropwise. The reaction solution was stirred for 2 hr at room temperature. After the resultant reaction solution was filtered through celite, the solvent was distilled off under reduced pressure, and the residue was purified with silica-gel column chromatography to obtain compound (AD) (1.5 g, 2.4 mmol).

Data for identification of compound (AD) are as follows.

Elemental analysis: Calculated value ($C_{44}H_{40}N_2O_2$) C, 84.04; H, 6.41; N, 4.46.

Measured value C, 83.82; H, 6.55; N, 4.81

Mass spectrometry (EI): 628 ($M^+$)

Example 13

Synthesis of Polymer Compound (7-1)

Polymer compound (7-1) was obtained in the same way as Example 2 except that compound (AB) was used instead of compound (F). The weight average molecular weight (Mw) of polymer compound (7-1) was 70900 and its molecular distribution index (Mw/Mn) was 2.41. The value of m/(m+n) in the polymer compound was 0.058 which was estimated from the results of ICP elemental analysis and $^{13}$C-NMR measurement. In polymer compound (7-1), the value of x/n was 0.49 and the value of y/n was 0.51.

Example 14

Synthesis of Polymer Compound (8-1)

Polymer compound (8-1) was obtained in the same way as Example 2 except that compound (AD) was used instead of compound (F). The weight average molecular weight (Mw) of polymer compound (8-1) was 45100 and its molecular distribution index (Mw/Mn) was 2.85. The value of m/(m+n) in the polymer compound was 0.070 which was estimated from the results of ICP elemental analysis and $^{13}$C-NMR measurement. In polymer compound (8-1), the value of x/n was 0.53 and the value of y/n was 0.47.

Example 15

Production and Evaluation of an Organic Light-Emitting Device

An organic light-emitting device was produced in the same way as Example 4 except that the coating solution used for forming the light-emitting layer was prepared from polymer compound (7-1) (90 mg) and toluene (2910 mg). The produced organic light-emitting device exhibited orange light emission. For the produced organic light-emitting device, the maximum external quantum efficiency, the maximum attainable brightness, and the half-life of brightness at an initial brightness of 100 cd/m² in constant current driving are shown in Table 3.

Example 16

Production and Evaluation of an Organic Light-Emitting Device

An organic light-emitting device was produced in the same way as Example 4 except that the coating solution used for forming the light-emitting layer was prepared from polymer compound (8-1) (90 mg) and toluene (2910 mg). The produced organic light-emitting device exhibited orange light emission. For the produced organic light-emitting device, the maximum external quantum efficiency, the maximum attainable brightness, and the half-life of brightness at an initial brightness of 100 cd/m² in constant current driving are shown in Table 3.

TABLE 3

| | Polymer compound | Low molecular weight compound | Maximum external quantum efficiency (%) | Maximum attainable brightness (cd/m²) | Half-life of brightness (h) |
|---|---|---|---|---|---|
| Example 15 | 7-1 | — | 8.0 | 60000 | 4500 |
| Example 16 | 8-1 | — | 7.7 | 46000 | 4000 |

The invention claimed is:

1. An organic light-emitting device in which at least one organic layer comprising a light-emitting layer is sandwiched between an anode and a cathode and a phosphorescent compound in the light-emitting layer emits light, wherein the light-emitting layer comprises a polymer compound comprising a structural unit derived from a polymerizable compound (W) represented by the following formula (W):

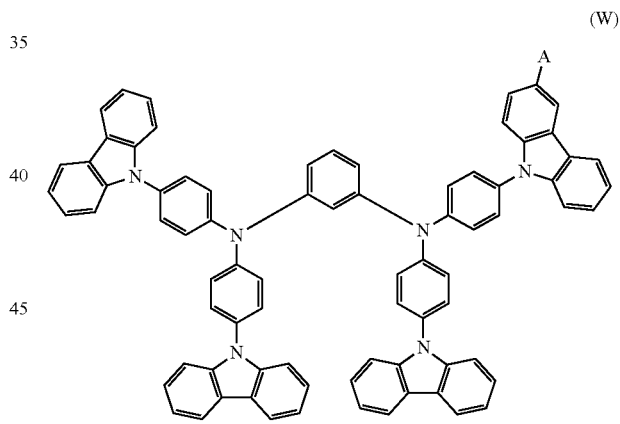

(W)

wherein, A represents a substituent having a polymerizable functional group, the polymerizable functional group being a radical polymerizable functional group selected from the group consisting of an allyl group, an alkenyl group, an acrylate group, a methacrylate group, an urethane (meth)acrylate group, a methacryloyloxyethylcarbamate group, and a vinylamide group.

2. An organic light-emitting device according to claim 1, wherein said polymer compound further comprises a structural unit derived from a phosphorescent polymerizable compound (B).

3. An organic light-emitting device according to claim 2, wherein said phosphorescent polymerizable compound (B) is a complex represented by the following general formula (2-1):

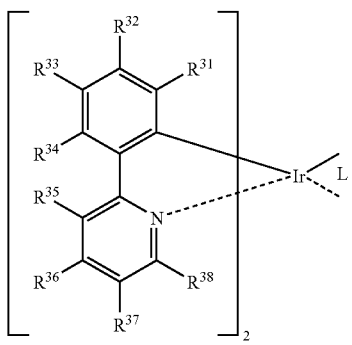

(2-1)

wherein, $R^{31}$-$R^{38}$ each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; each two groups of $R^{31}$ and $R^{32}$, $R^{32}$ and $R^{33}$, $R^{33}$ and $R^{34}$, $R^{34}$ and $R^{35}$, $R^{35}$ and $R^{36}$, $R^{36}$ and $R^{37}$, and $R^{37}$ and $R^{38}$ may bond to each other to form a fused ring; and L represents a bidentate ligand selected from the group consisting of the following general formulae (2-2) to (2-4);

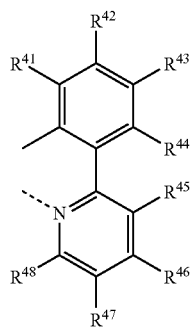

(2-2)

wherein at least one of $R^{41}$-$R^{48}$ represents a substituent having a polymerizable functional group; $R^1$-$R^{24}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{41}$ and $R^{42}$, $R^{42}$ and $R^{43}$, $R^{43}$ and $R^{44}$, $R^{44}$ and $R^{45}$, $R^{45}$ and $R^{46}$, $R^{46}$ and $R^{47}$, and $R^{47}$ and $R^{48}$ may bond to each other to form a fused ring;

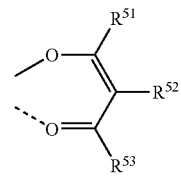

(2-3)

wherein at least one of $R^{51}$-$R^{53}$ represents a substituent having a polymerizable functional group; $R^{51}$-$R^{53}$ except for the at least one substituent having a polymerizable functional group each represent independently an atom or a substituent selected from the group consisting of a hydrogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{51}$ and $R^{52}$ and $R^{52}$ and $R^{53}$ may bond to each other to form a fused ring;

(2-4)

wherein at least one of $R^{61}$-$R^{64}$ represents a substituent having a polymerizable functional group; $R^{61}$-$R^{64}$ except for the substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{61}$ and $R^{62}$, $R^{62}$ and $R^{63}$, and $R^{63}$ and $R^{64}$ may bond to each other to form a fused ring.

4. An organic light-emitting device according to claim 1, wherein said polymer compound further comprises a structural unit derived from a phosphorescent polymerizable compound (B) and a structural unit derived from an electron transport polymerizable compound (C).

5. An organic light-emitting device according to claim 4, wherein said electron transport polymerizable compound (C) is an oxadiazole derivative, a triazole derivative or a triarylborane derivative.

6. An organic light-emitting device according to claim 1, wherein said light-emitting layer further comprises a phosphorescent compound (E).

7. An organic light-emitting device according to claim 1, wherein said light-emitting layer further comprises a phosphorescent compound (E) and said polymer compound further comprises a structural unit derived from an electron transport polymerizable compound (C).

8. An area light source, wherein the organic light-emitting device as described in claim 1 is used.

9. An image display device, wherein the organic light-emitting device as described in claim 1 is used.

10. A polymer compound comprising a structural unit derived from a polymerizable compound (W) represented by the following formula (W):

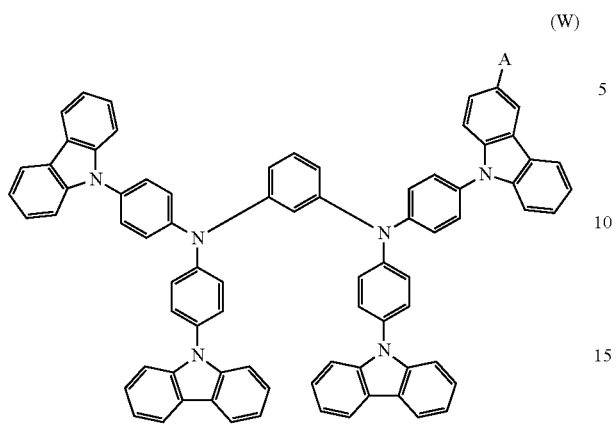

(W)

wherein A represents a substituent having a polymerizable functional group, the polymerizable functional group being a radical polymerizable functional group selected from the group consisting of an allyl group, an alkenyl group, an acrylate group, a methacrylate group, an urethane (meth)acrylate group, a methacryloyloxyethylcarbamate group, and a vinylamide group.

11. A polymer compound according to claim 10, comprising a structural unit derived from a phosphorescent polymerizable compound (B) represented by the following general formula (2-1):

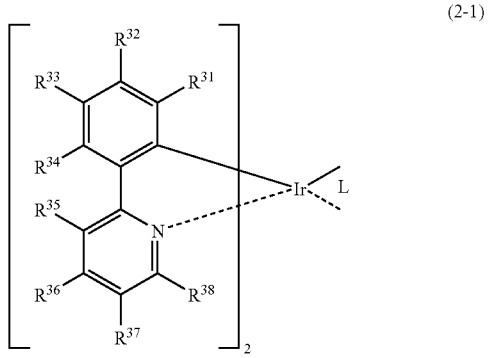

(2-1)

wherein $R^{31}$-$R^{38}$ each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; each two groups of $R^{31}$ and $R^{32}$, $R^{32}$ and $R^{33}$, $R^{33}$ and $R^{34}$, $R^{34}$ and $R^{35}$, $R^{35}$ and $R^{36}$, $R^{36}$ and $R^{37}$, and $R^{37}$ and $R^{38}$ may bond to each other to form a fused ring; and L represents a bidentate ligand selected from the group consisting of the following general formulae (2-2) to (2-4);

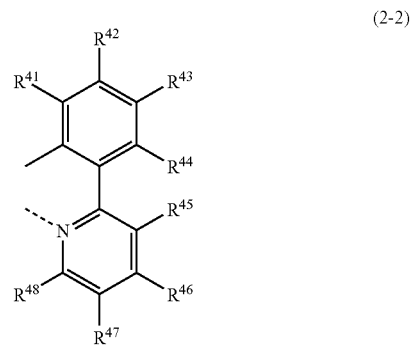

(2-2)

wherein at least one of $R^{41}$-$R^{48}$ represents a substituent having a polymerizable functional group; $R^{41}$-$R^{48}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{41}$ and $R^{42}$, $R^{42}$ and $R^{43}$, $R^{43}$ and $R^{44}$, $R^{44}$ and $R^{45}$, $R^{45}$ and $R^{46}$, $R^{46}$ and $R^{47}$, and $R^{47}$ and $R^{48}$ may bond to each other to form a fused ring;

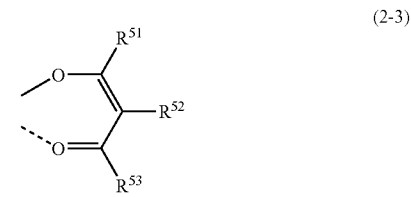

(2-3)

wherein at least one of $R^{51}$-$R^{53}$ represents a substituent having a polymerizable functional group; $R^{51}$-$R^{53}$ except for the at least one substituent having a polymerizable functional group each represent independently an atom or a substituent selected from the group consisting of a hydrogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{51}$ and $R^{52}$ and $R^{52}$ and $R^{53}$ may bond to each other to form a fused ring;

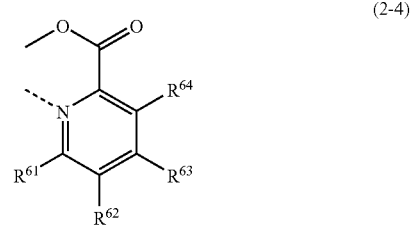

(2-4)

wherein at least one of $R^{61}$-$R^{64}$ represents a substituent having a polymerizable functional group; $R^{61}$-$R^{64}$ except for the at least one substituent having a polymerizable functional group each represent independently an atom or a substituent selected from the group consisting of a hydrogen atom, a halogen atom, a cyano group, an alkyl group having 1 to 10 carbon atoms, an aryl group having 6 to 10 carbon atoms, an amino group optionally substituted with alkyl group(s) having 1 to 10 carbon atoms, an alkoxy group having 1 to 10 carbon atoms and a silyl group; and each two groups of $R^{61}$ and $R^{62}$, $R^{62}$ and $R^{63}$, and $R^{63}$ and $R^{64}$ may bond to each other to form a fused ring.

* * * * *